United States Patent [19]
Waterloo

[11] 3,764,250
[45] Oct. 9, 1973

[54] BLOW MOLDING MACHINE
[75] Inventor: William C. Waterloo, York, Pa.
[73] Assignee: Graham Engineering Corporation, York, Pa.
[22] Filed: Nov. 1, 1971
[21] Appl. No.: 194,635

[52] U.S. Cl.............. 425/326, 425/233, 425/387, 425/384, 425/450, 425/453, 264/99
[51] Int. Cl........................................... B29c 17/04
[58] Field of Search ............... 425/86, 98, 99, 126, 425/150, 326, 342, 384, 387, 405, 233, 383, 451, 435, 453, ; 264/97, 99

[56] References Cited
UNITED STATES PATENTS

| | | | |
|---|---|---|---|
| 3,310,834 | 3/1967 | Simpson et al. | 264/99 X |
| 3,632,249 | 1/1972 | Pearson | 425/151 |
| 3,115,673 | 12/1963 | Rudolph | 264/99 |
| 3,365,748 | 1/1968 | Cote | 425/326 B X |
| 2,750,624 | 6/1956 | Coates et al. | 425/326 B X |
| 3,005,231 | 10/1961 | Pechthold | 425/326 B |
| 3,305,891 | 2/1967 | Nozaki | 425/326 B |
| 3,334,379 | 8/1967 | Settembrini | 425/326 B X |
| 3,473,192 | 10/1969 | Martelli | 425/326 B X |
| 2,515,093 | 7/1950 | Mills | 425/326 |
| 2,579,390 | 12/1951 | Mills | 264/99 |
| 2,579,399 | 12/1951 | Ruekberg | 425/342 |
| 2,750,625 | 6/1956 | Colombo | 425/387 |
| 3,012,286 | 12/1961 | Gasmire | 264/97 |
| 3,200,179 | 8/1965 | Moran | 264/98 |
| 3,218,669 | 11/1965 | Baker | 425/296 |
| 3,344,470 | 10/1967 | Hufford | 425/326 |
| 3,344,471 | 10/1967 | Martelli | 425/214 |
| 3,345,686 | 10/1967 | Di Settembrini | 425/326 |

Primary Examiner—Robert L. Spicer, Jr.
Attorney—C. Hercus Just

[57] ABSTRACT

This invention pertains to a machine for manufacturing synthetic resin extrusion products by means which blow a plasticated resinous parison internally to expand it to engage the walls of a mold cavity within separable dies, the parison being discharged from an extruder head vertically upward for reception between the mold dies while moving upwardly and thereby insure the positioning of the parison in substantially straight condition within the die cavity as aforesaid. The machine is operable automatically to enclose the parison between pairs of mold dies while moving in a circular path disposed substantially in a vertical plane and various types of adjustable means are included in the machine to control the position of the mold closing station, the mold opening station, and the duration within which the parison and subsequent molded objects are retained within the mold dies.

35 Claims, 27 Drawing Figures

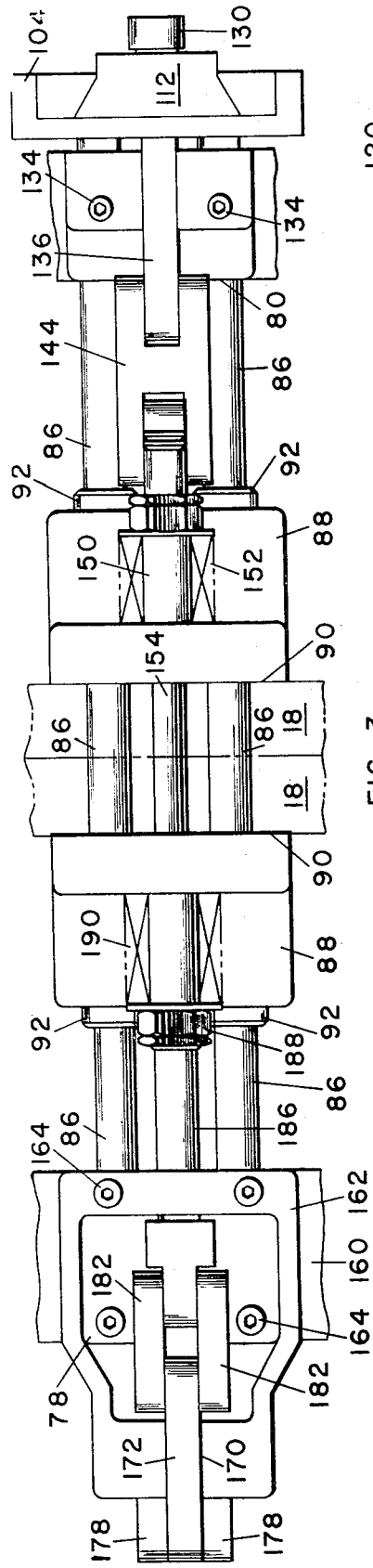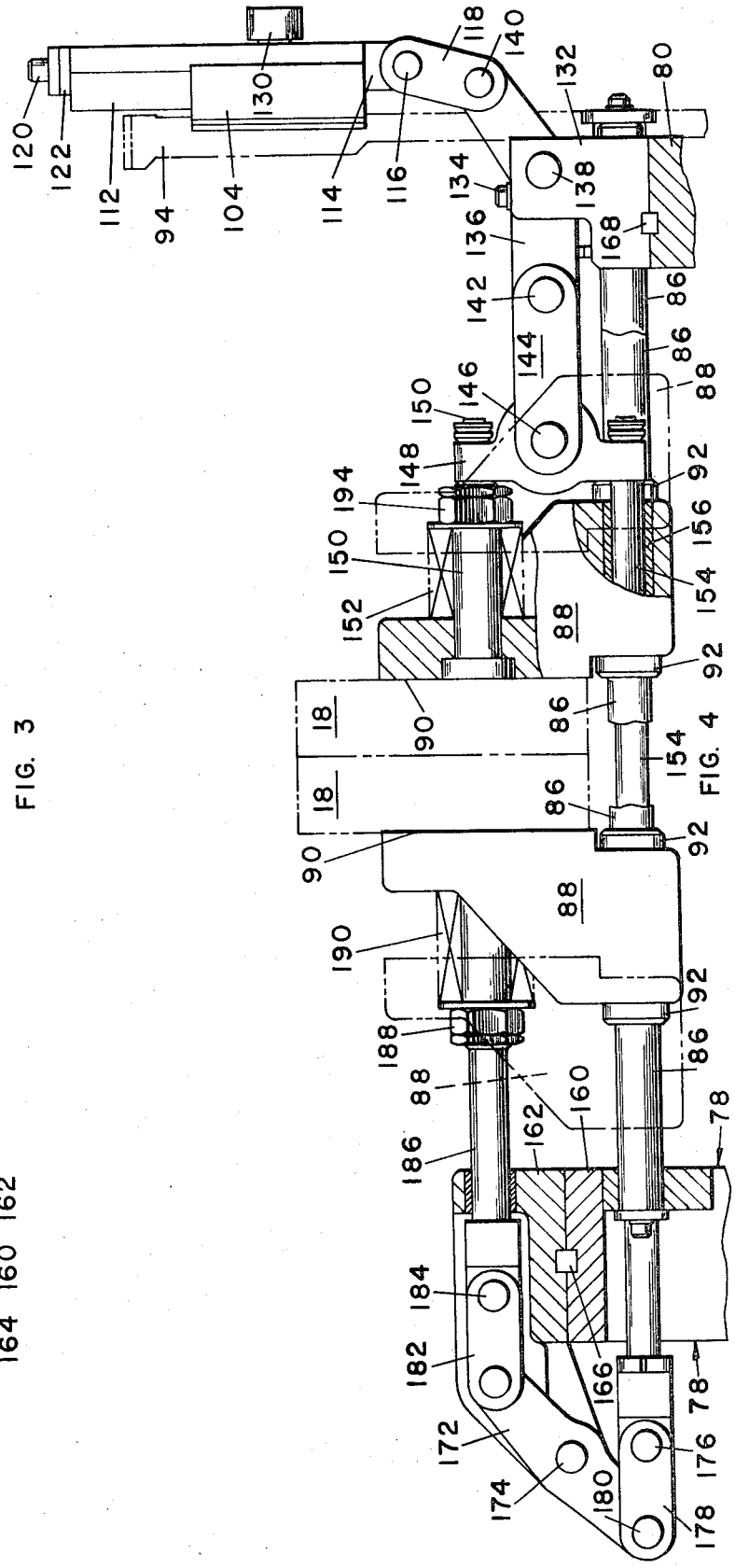

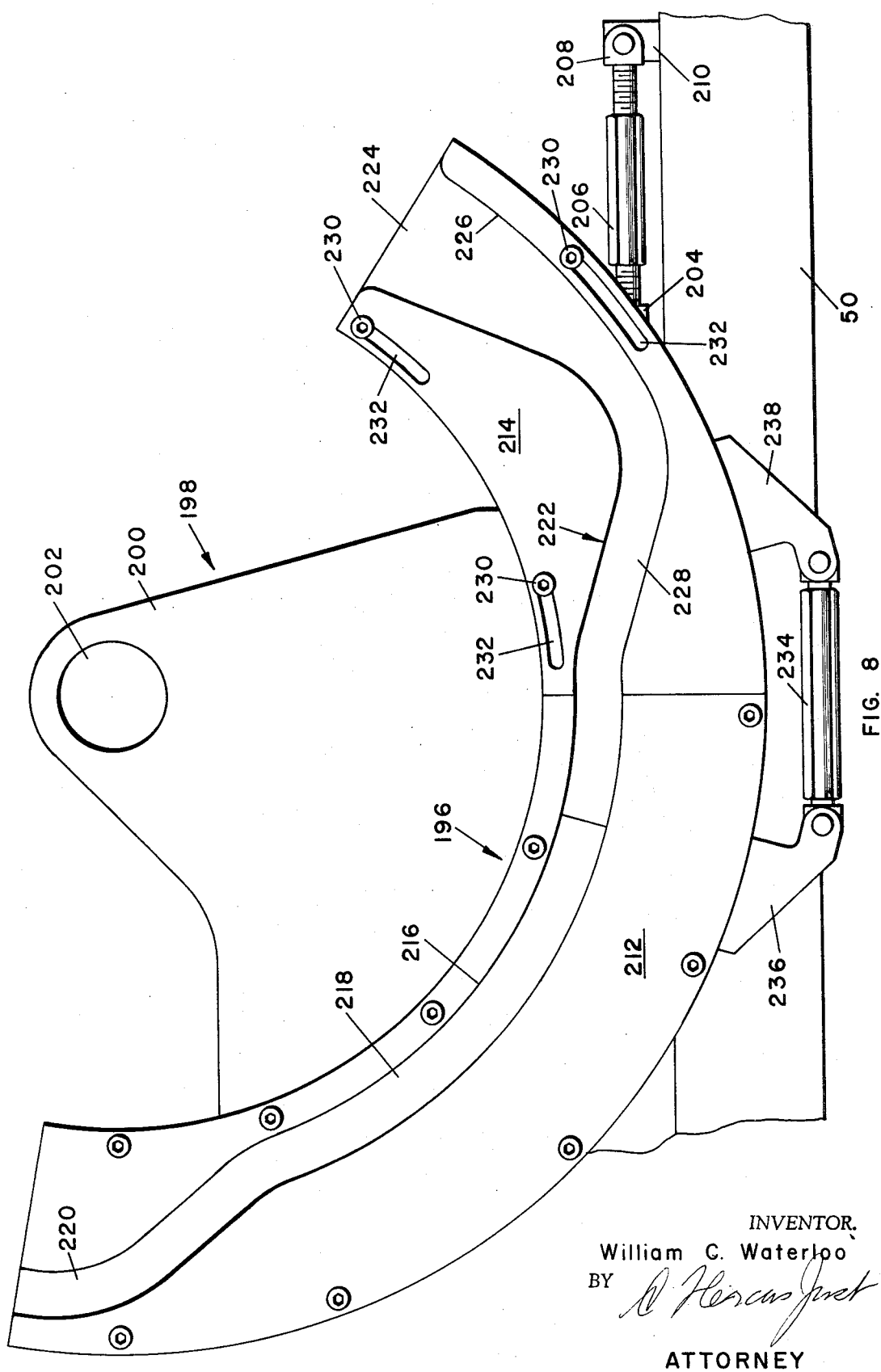

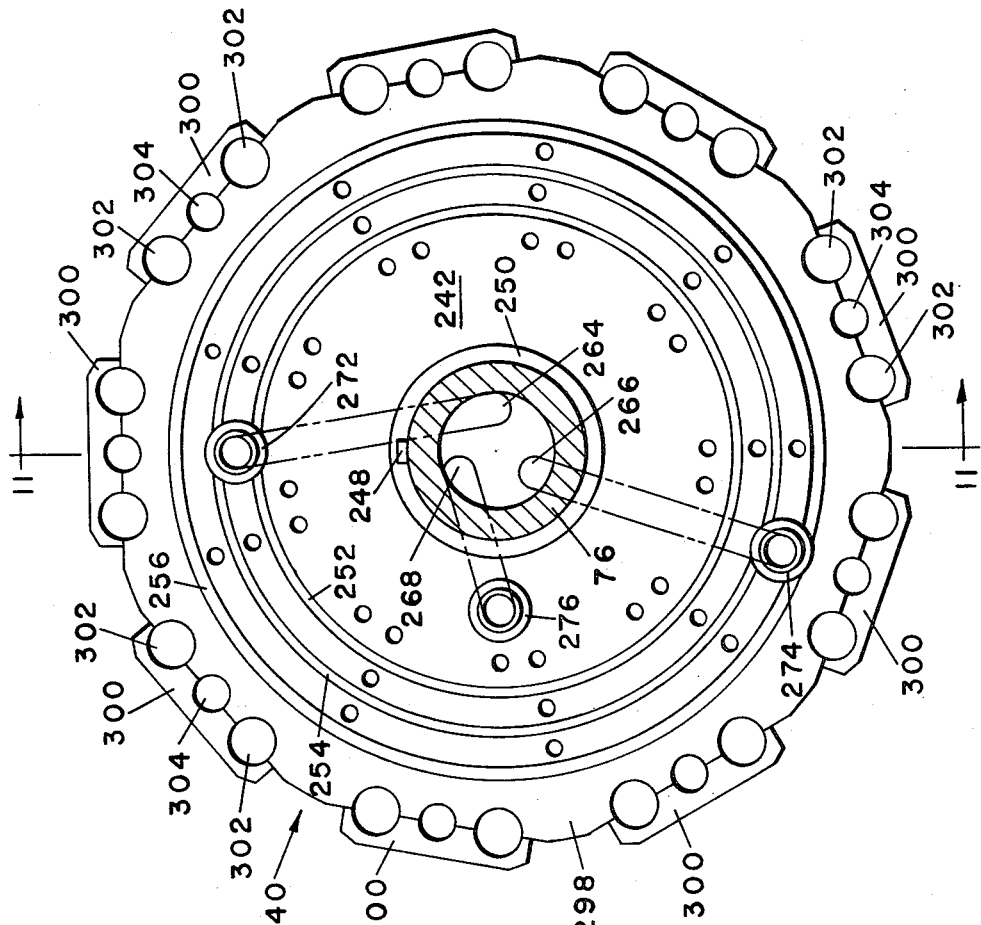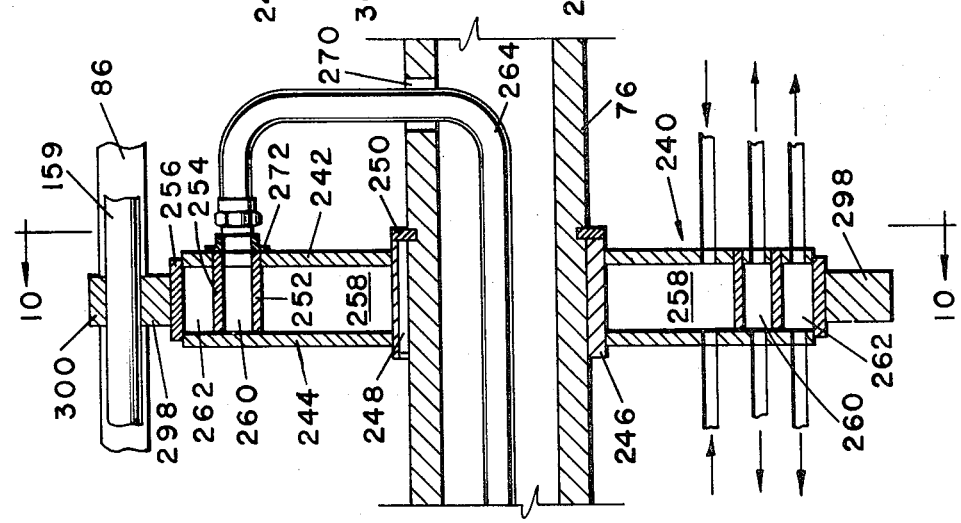

INVENTOR.
William C. Waterloo

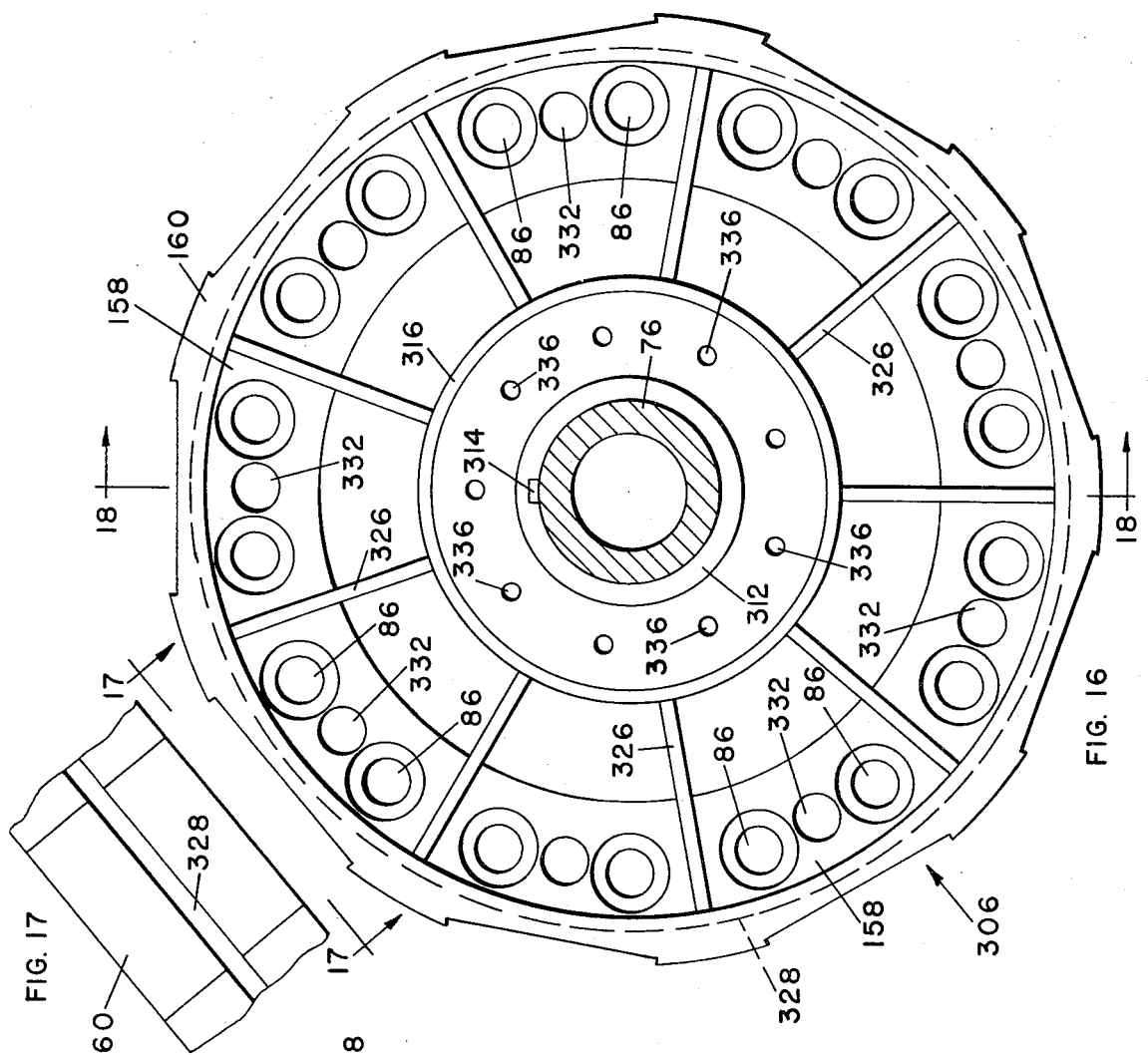
FIG. 16
FIG. 17
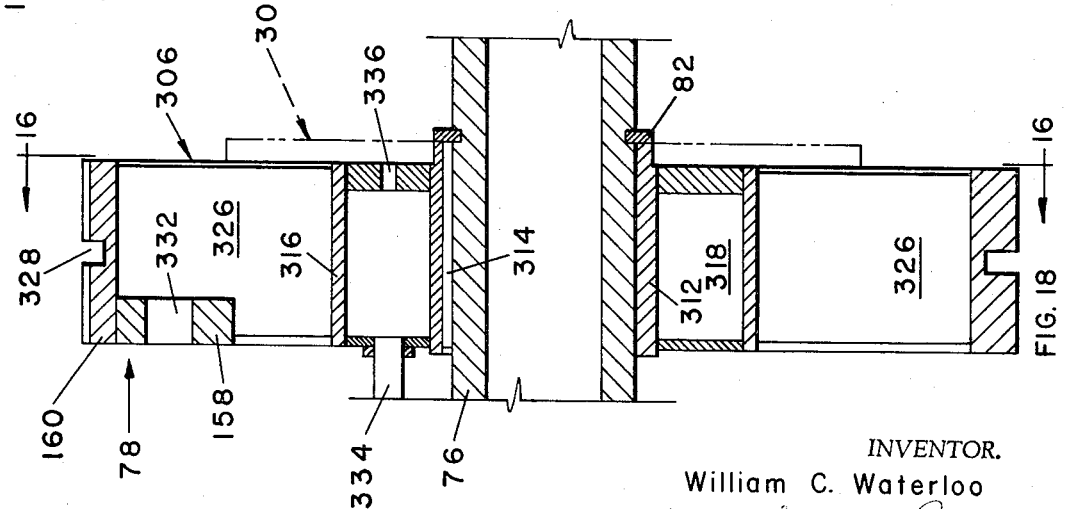
FIG. 18
INVENTOR.
William C. Waterloo
BY
ATTORNEY

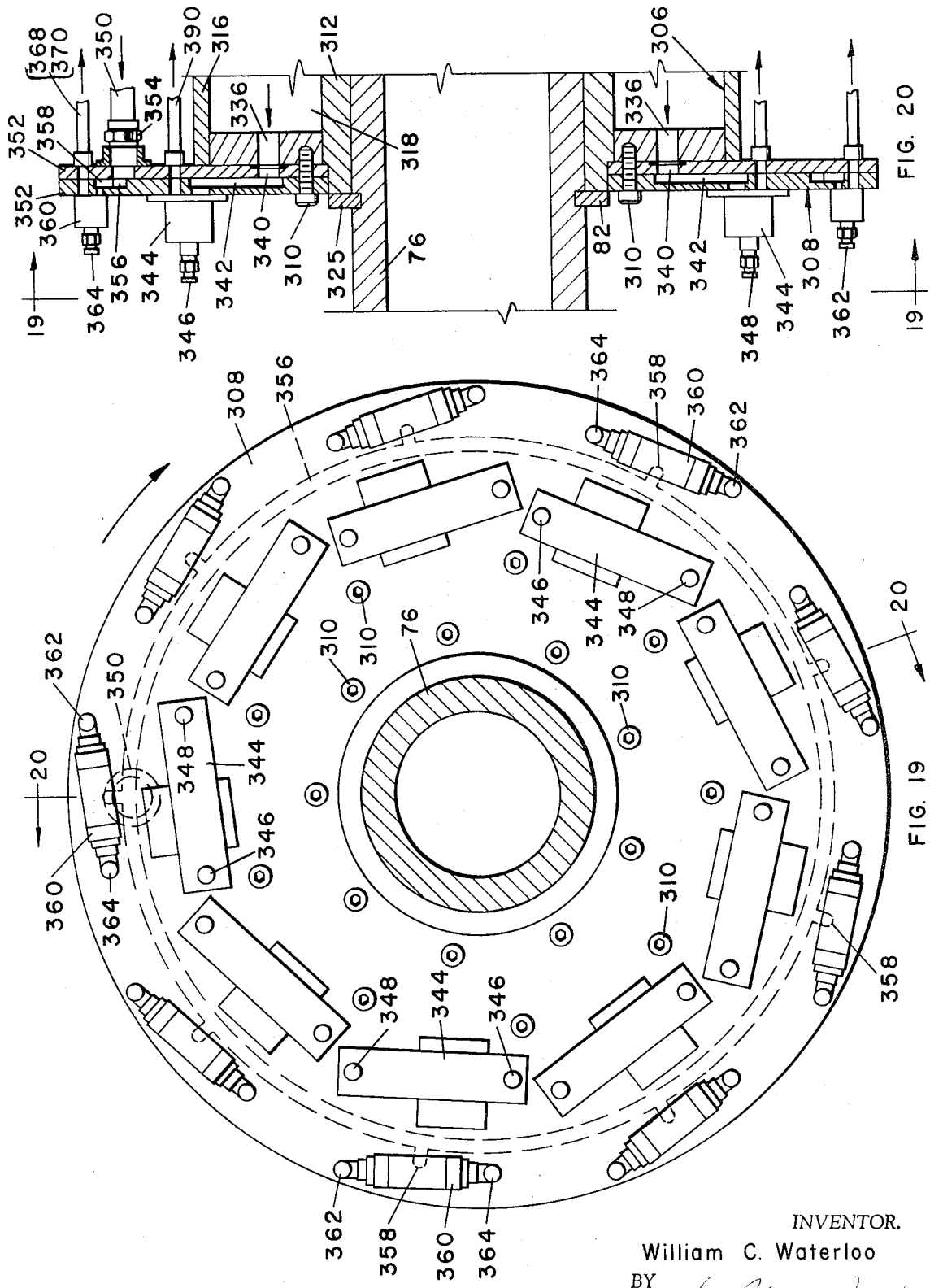

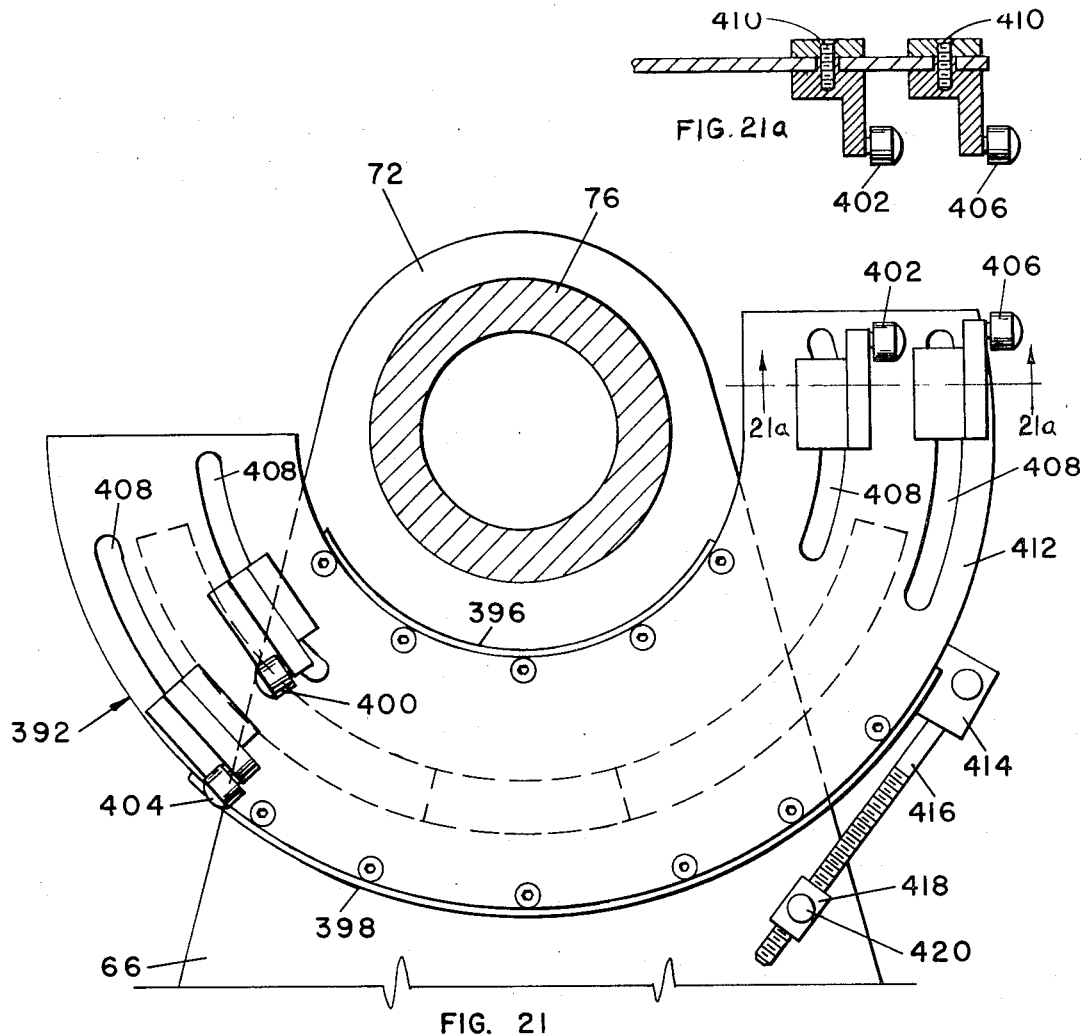
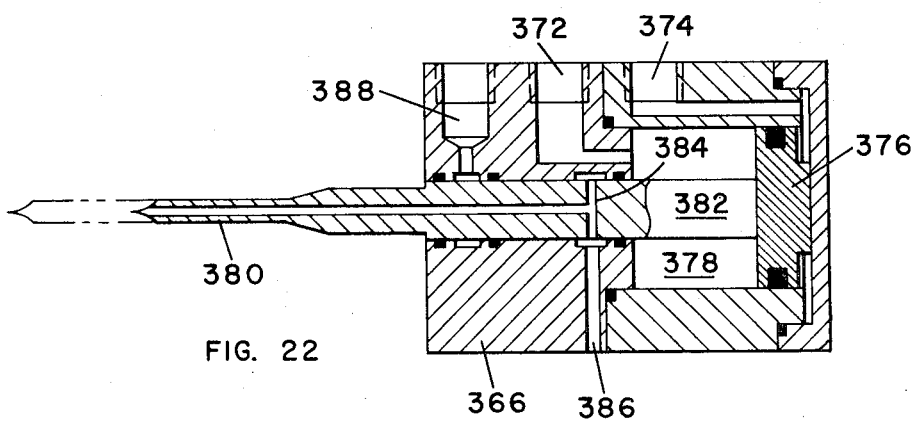

*INVENTOR.*
William C. Waterloo
BY
ATTORNEY

BLOW MOLDING MACHINE

CROSS-REFERENCES TO RELATED APPLICATION

The present invention comprises the basic machine in which hollow articles such as blow molded containers or other products are produced from a blown-in-the-mold parison tube. Plasticated resin from which the parison is formed is produced preferably in an extruder having temperature control means comprising the subject matter of pending application, Ser. No. 73,870, in the name of William C. Waterloo, filed Sept. 21, 1970.

The parison formed by such aforementioned extruder preferably is discharged through a parison head including a side flow diverter comprising the subject matter of Ser. No. 123,595, in the name of William C. Waterloo, filed Mar. 12, 1971.

Coordination of operation of the parison extruder and parison discharge head and especially the means for programming the operation of said discharge head to produce parisons having desired wall configurations which may be delivered to the blow molding machine of the present invention, comprise the subject matter of pending application, Ser. No. 123,594, in the name of William C. Waterloo, filed Mar. 12, 1971.

Mold dies having certain flow regulating means which may be used with the blow molding machine of the present invention comprise the subject matter of pending application, Ser. No. 123,596, in the name of William C. Waterloo, filed Mar. 12, 1971.

BACKGROUND OF THE INVENTION

The present invention pertains to a blow molding machine adapted to receive a continuously formed tubular parison comprising plasticized synthetic resin and sequentially enclose connected sections of said parison between pairs of cooperating mold dies, followed by the injection of air into said sections of the parison, after the opposite ends of said sections have been flattened into closed condition, so as to expand such segregated sections of the parison into faithful conformity with the sidewalls of the mold cavity within the mold dies.

Essentially, the foregoing procedure is characteristic of the operation of many types of blow molding machines which have been developed heretofore. For many years past, certain types of said machines have included connected series of dies movable in various paths during which parisons have been blown into desired shapes within mold cavities and discharged therefrom. As the industry has progressed, however, greater refinements and perfection of products have been insisted upon by the product consumers. In addition, ways and means have been sought constantly to reduce production costs, produce increased refinements for adjustment in the operation of the machine, improve the quality of the products, such as by improving the strength commensurate with minimum quantities of material included in each product, minimize wear upon the various moving elements of the machine, and improve the automatic characteristics thereof.

In the prior machines and systems, various deficiencies have existed in such aforementioned areas in which improvements have been demanded by the industry and the customers for such products. Among some of the earlier machines are those comprising the subject matter of U.S. Pat. Nos. 2,515,093, issued July 11, 1950 and 2,579,390, issued Dec. 18, 1951, both in the name of E. E. Mills. One of the principal deficiencies of said machines is the fact that the molds are carried by a horizontal table movable about a vertical axis and the parison is fed horizontally from an extrusion machine, whereby the parison is unsupported between the discharge nozzle of the machine and the mold cavities and therefore sagging of the parison in said unsupported region frequently results in uneven wall thicknesses in the blown product.

Other deficiencies in prior machines include insufficient possibilities of adjusting the cycling operations relative to injecting the blow needle into the parison and discharging air into the parison to expand it, as well as inadequate possibilities of adjusting readily the positions in the path of movement of the rotatable mold-carrying frame when the molds close and open.

More particularly, effecting adjustment of such foregoing operations in existing machines requires the machines to be stopped while time-consuming adjustments are made.

The manner in which temperature regulation of the molds presently is provided leaves much to be desired, especially in molds within which articles having variations in sidewall thickness are formed, such as where zone type temperature regulation would be preferable.

In order to overcome the deficiencies in the operation and the products produced by blow molding machines presently used, as well as those used heretofore, it is the principal object of the present invention to provide improved details and characteristics in the blow molding machine comprising the subject matter of said invention by arranging the path of movement of the mold dies at the instant of enclosing the parison so as to move upward and thereby pull an upwardly discharging parison from the flow head of the extruder to insure concentricity of the parison within the mold and straightness of the parison to insure even expansion thereof within the mold cavity.

Another object of the invention is to provide maximum stability in supporting the sets of mold dies while traversing their path of movement.

A further object is to minimize the possibility of intermixing of air and water required in the operation of the machine respectively by the facilities for injecting air into the parisons and cooling the dies.

Still another object of the invention is to provide maximum adjustability of the position of the mold-closing station and mold-unloading station in the path of movement of the mold dies, such adjustability also preferably being achieved by means which are positioned so as to be capable of operation by an attendant while the machine is operating.

A still further object of the invention is to provide means by which the molds, during the movement along their path of operation, may be precisely adjusted in several transversely related horizontal directions, as well as in a vertical direction with respect to the delivery of the parison to the mold cavities to provide preferred alignment of the parison with said cavities.

Still another object of the invention is to provide continuously decreasing velocity to a zero value in the movement of the mold dies to closed position and thereby minimize the distortion of the parison while being enclosed between the mold dies.

A still further object of the invention is to provide readily accessible means, which are operable while the machine is operating, to adjust the location in the path of movement of the mold dies at which air is injected into the parison and at which such injection is discontinued at an additional location which also is adjustable by said readily accessible means.

A still further object of the invention is to provide means by which, at the commencement of operation of the machine for a predetermined size of product, the clamping pressure by which the mold dies are held in closed position may be adjusted so as to be suitably adapted to the size of the product to be produced.

Further, other and additional objects of the invention will become apparent from the Summary, Detailed Description, Claims and drawings which follow hereinafter.

BRIEF SUMMARY OF THE INVENTION

One of the principal improved aspects of the invention comprises the arrangement of similar pairs of mold dies upon frame means movable about a horizontal shaft, unidirectionally, and including actuating means for each pair of mold dies which operate substantially midway of the upward movement of the pair of dies at what is termed the loading station in said path and enclose a section of a tubular parison which is discharged vertically upward from a flow head of an extruder in substantially straight condition. More particularly, such vertical upward movement of the dies at the moment of enclosing a section of the parison occurs at a slightly greater speed than the normal discharge rate of the parison from the flow head, thereby producing limited longitudinal tension in the parison whereby, when the parison is blown in a transverse direction by injection air to expand the same against the interior walls of the mold cavity between the dies, lateral tension is placed upon the parison which results in bi-axial orientation of the parison to greatly improve the strength of the blown product.

In another aspect of the invention, the plurality of pairs of mold dies are mounted upon a frame fixed to and rotatable with a horizontal shaft supported within bearings disposed at a predetermined elevation above a base frame. Said bearings are vertically adjustable relative to the base frame for varying the vertical position of the mold-closing station. The base frame also is horizontally adjustable in two transversely related directions with respect to the axis of the upwardly moving parison as it is being discharged by the flow head of an extruder, whereby very precise relationship is established between said vertically moving parison and the mold dies at the instant the same enclose the parison to effect expansion of a segregated section thereof by air injected into the same in accordance with a precise, readily adjustable schedule of operation of valve means which control both the injection of air into the parison and the exhaustion of air therefrom.

A still further aspect of the invention is to support said pairs of mold dies upon transversely extending guide rods supported at the opposite ends thereof by side members of said rotatable frame, each pair of mold dies being provided with actuating means comprising pivoted linkage, a portion of which comprises a toggle, the linkage being so arranged that simultaneous and opposite movements of the mold dies are effected, either in mold-closing or mold-opening direction by actuation of the linkage means through the operation of a cam follower engageable with an adjustable cam readily accessible for any desired adjustment, while the machine is operating, and thereby controlling precisely the location at which the mold-closing station and mold-opening station are located in the path of movement of the mold dies by said rotatable frame.

Still another aspect of the invention is the provision of an air-injection needle on at least one mold die of each pair thereof, said needle being projectable and retractable with respect to the mold dies, preferably by pneumatic means comprising a cylinder and piston, air being supplied to opposite sides of said piston respectively by conduits having valves which are operated at precise locations in the path of movement of the mold dies, such operation preferably being by cam means which are individually adjustable on supporting mechanism which, in turn, is additionally adjustable with respect to the base of the machine to effect simultaneous adjustment of all of said cams, if desired. Accordingly, during the path of movement of said pairs of mold dies, the air-injecting needle is insertable into the die and parison in a precise location susceptible of ready adjustment, the needle is retracted correspondingly at another readily adjustable location, the air which inflates the parison is discharged through the needle by means of a valve which is actuated at still another precise and adjustably located position, and the injected air is exhausted from the inflated parison through a valve means also precisely located at a still further readily adjustable location. All of said adjustments can be made independently of each other or, at least certain of them, can be made simultaneously. Of substantial importance is the fact that all of such adjustments likewise can be made while the machine is operating.

One further aspect of the invention is that the mold dies of each pair respectively are supported by jaws slidable upon the guide rods of said rotatable frame and the mechanism which opens and closes each pair of mold dies is applied to said jaws through compressible means which are adjustable to exert a predetermined force upon the mold dies, when closed, whereby the clamping pressure applied to the mold dies is determined in accordance with the size of the container to be produced. Specifically, the adjustment of such pressure is very simply achieved by sets of clamping nuts and locknuts mounted on threaded shafts upon which the pressure means is supported.

One other aspect of the invention is that the pairs of mold dies have internal passages through which cooling fluid, such as water, is passed to and from a manifold which preferably has two zones therein respectively capable of handling cooling fluid of different temperatures. Likewise, the dies have different passage systems at spaced locations therein in order that zone-cooling of the dies may be achieved and thereby effect more efficient cooling of products which have been formed in the dies by a blown-in-the-mold technique, whereby the more massive portions of the product, for example, will engage portions of the mold dies which are operated at a lower temperature than those portions which engage the less massive portions of the product.

Further, other and additional aspects and advantages of the invention will become apparent from the description and claims which follow hereinafter.

DESCRIPTION OF THE DRAWINGS

FIG. 3 is an enlarged, partially sectioned, front elevation of a mold unit and actuating means therefor comprising part of the blow molding machine shown in FIGS. 1 and 2.

FIG. 4 is a top plan view of the structure shown in FIG. 3.

FIG. 8 is a large scale vertical elevation of a cam unit carried by the base structure of the machine for engagement by the actuating units which operate the linkage mechanism for reciprocating the molds relative to each other, as seen on the line 8—8 of FIG. 2.

FIG. 10 is a vertical sectional view of the fluid manifold as seen on the line 10—10 of FIG. 11, said manifold being carried by portions of the Ferris wheel frame of the machine as shown in FIG. 2, but employing a larger scale than in said figure.

FIG. 11 is a vertical sectional elevation of the fluid manifold shown in FIG. 10 as seen on the line 11—11 of said figure.

FIG. 16 is a vertical sectional view of the principal air manifold which is carried by the rotatable Ferris wheel frame of the machine adjacent one side thereof to distribute parison-blowing air to the molds and also actuate the parison injecting needle for such air, as seen on the line 16—16 of FIG. 18.

FIG. 17 is a fragmentary plan view of a section of the exterior surface of the air manifold shown in FIG. 16 as seen on the line 17—17 thereof.

FIG. 18 is a vertical sectional elevation of the principal air manifold shown in FIG. 16 as seen on the line 18—18 thereof.

FIG. 19 is a vertical end elevation of an auxiliary air manifold which is attracted to the principal air manifold shown in FIGS. 16–18, as seen on the line 19—19 of FIG. 20.

FIG. 20 is a vertical sectional elevation taken on the line 20—20 of FIG. 19 and showing said auxiliary air manifold connected to the principal air manifold which is shown fragmentarily thereon.

FIG. 21 is a vertical elevation of an adjustable cam assembly by which valves carried by the air manifolds are actuated, said cam being shown on the line 21—21 of FIG. 2 adjacent one side of the machine and illustrated on a substantially larger scale than employed in FIG. 2.

FIG. 21a is a fragmentary detail shown on line 21a–21a of FIG. 21.

FIG. 22 is a longitudinal sectional view of an exemplary air cylinder and parison injection needle assembly of the type associated with one mold die of each pair thereof, as shown in FIG. 23.

FIG. 24 is an enlarged vertical sectional elevation illustrating one of the casters by which the base frame is movably supported upon track means as seen on the line 24—24 of FIG. 1.

DETAILED DESCRIPTION OF THE INVENTION

Basic Frame and Ferris Wheel Frame for Mold Units

The blow molding machine comprising the present invention primarily is adapted to engage a tubular parison and transform the same into hollow, molded objects, such as containers of various types. Said parison comprises plasticated synthetic resin which is homogeniously melted within an extruder of suitable type. A highly capable extruder comprises the subject matter of co-pending application, Ser. No. 73,870, in the name of William C. Waterloo, filed Sept. 21, 1970. However, use of the present invention is not to be restricted to operating upon parisons formed by said extruder.

Figure 1:
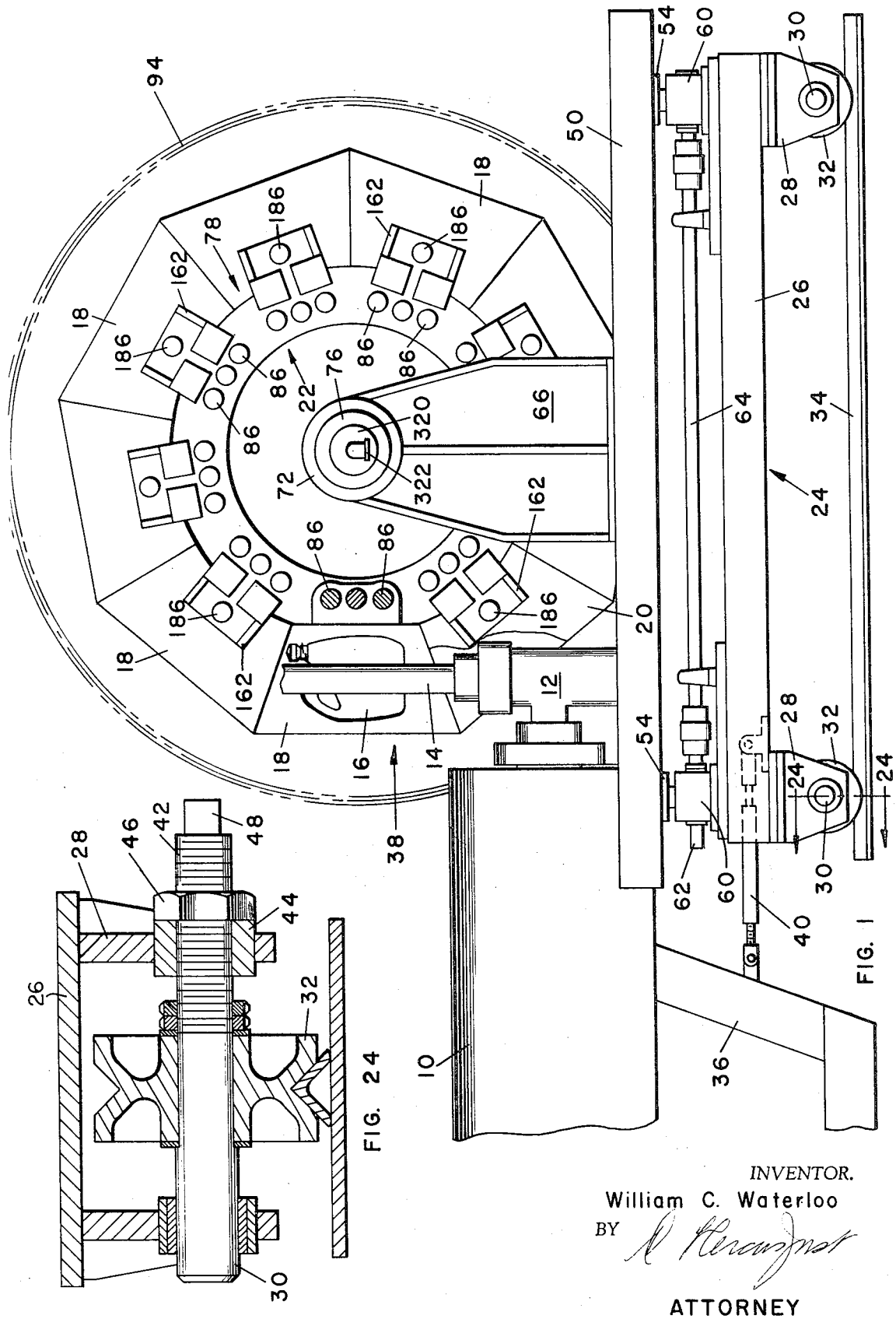
FIG. 1 is a side elevation of a blow molding machine embodying the principles of the present invention illustrated in operative relation to the discharge end of a fragmentarily illustrated flow head of an extruder and adjustable in working relationship relative to the axis of the same.

Referring to FIG. 1, the delivery end portion of a typical extruder 10 is shown fragmentarily adjacent the lefthand end of said view. Plasticated resin form in said extruder is discharged therefrom through a flow head 12 which, for example, may be the same as or similar to the head comprising the subject matter of co-pending application, Ser. No. 123,595, in the name of William C. Waterloo, filed Mar. 12, 1971. However, other types of flow heads may be used in lieu of the one referred to. The object of the flow head is to form the plasticated resin into a tubular parison 14 of prorgrammed wall thicknesses which is illustrated in FIG. 1 in exemplary manner as extending vertically and longitudinally relative to a mold die cavity 16 formed in the open face of a mold die 18, the opposing die being removed from the view for purposes of illustration. A portion of the mold unit 20 is broken away to permit illustration of the flow head 12 in exemplary relation to the axis of the mold die supported by the Ferris wheel frame which comprises a mold-carrying frame, details of which are described hereinafter.

Figure 2:
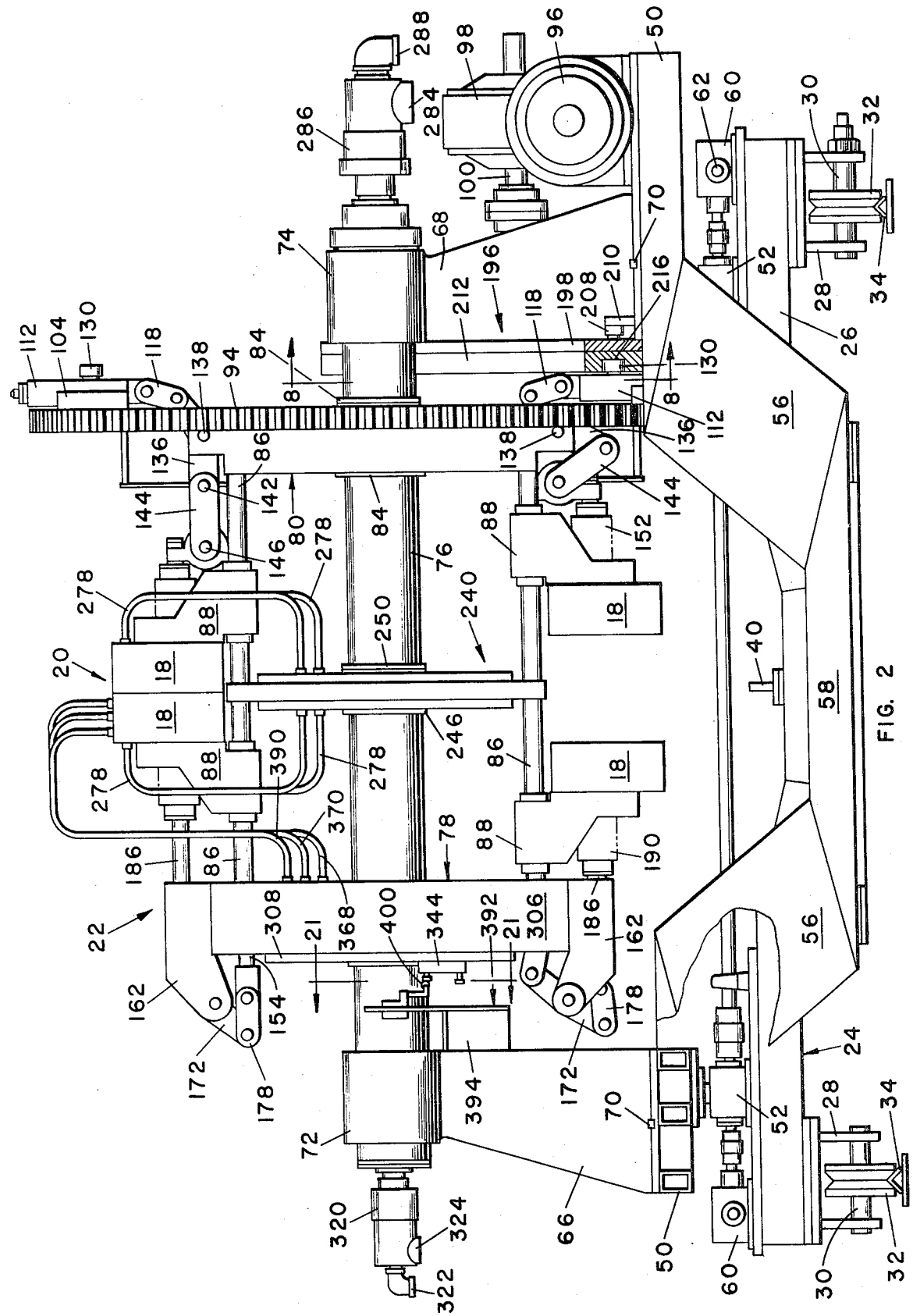
FIG. 2 is a front elevation of the blow molding machine shown in FIG. 1, as seen from the delivery end thereof, part of the frame structure of the machine being broken away to illustrate certain details thereof.

The blow molding machine of the present invention comprises base means 24 which includes a horizontal base frame 26 formed from suitable structural members and being generally rectangular in plan view. Depending from each corner of the base frame 26 is a heavy-duty caster yoke 28 which supports an axle 30 which extends horizontally and rotatably supports thereon a heavy-duty caster wheel 32. Each pair of caster wheels respectively at opposite sides of the base frame 26 rotate within a common vertical plane which is coincident with a track 34 that is sufficiently long to extend between a pair of said casters and beyond, as shown in FIG. 1. The upper surface of the track is complementary to the annular grooves in the caster wheels 32, as shown in FIG. 2.

According to the preferred operation of the blow molding machine of the invention, it is presupposed that the extruder 10 is mounted stationarily upon the supporting surface such as the floor of a plant, the same being supported by a frame 36 which is fragmentarily illustrated in FIG. 1. For purposes of suitably orienting the axis of the parison 14 with respect to the closed position of a pair of mold dies 18 at the exemplary loading station 38, which is indicated in exemplary manner by an arrow in FIG. 1, it is contemplated that the mold-supporting frame 22 may be adjustable horizontally in two directions respectively transverse to each other, one of these being parallel to the tracks 34 and the opposite direction being transverse thereto. The frame 22 also is adjustable vertically in opposite directions with respect to the base frame 26. To accomplish these adjustments, the following mechanisms and devices are provided.

To effect horizontal adjustment between the axis of the mold dies 18 and the flow head 12 in one horizontal direction, a first adjustment means 40 is provided which may be of a simple nature. As illustrated, it constitutes a heavy-duty turnbuckle which is interconnected at its opposite ends respectively to the frame 36 of extruder 10 and the base frame 26 of the machine as shown in FIG. 1 in exemplary manner. The turnbuckle 40 preferably is mounted midway between the opposite sides of the base frame 26 as shown in FIG. 2.

A second adjustment means adapted to permit movement of the base frame 26 in horizontal direction transverse to the first mentioned direction described above is shown in FIG. 24 in which exemplary adjustment means is illustrated which comprises axles 30 supported by each caster yoke 28 in a manner to axially adjust thereto. The adjustment means comprises one outer end 42 of the axle 30 being threaded for a portion of its length and threadably engaging a female threaded bushing 44 fixed within one leg of the caster yoke 28. A locknut 46 secures the axle 30 in desired longitudinally adjusted position. The adjustment may be effected by any suitable means such as a wrench-engageable end 48 provided on axle 30, which is of suitable cross-sectional geometric shape, or the same may be bored transversely to receive a rod by which the axle may be rotated. Also, it will be seen from FIG. 24 that the hub of the caster wheel 32 is secured against relative longitudinal movement upon the axle 30 by appropriate conventional means.

Supported above the base frame 26 is a horizontal additional base frame 50 which is vertically adjustable toward and from the base frame 26 by means of a suitable jack unit 52 supported at each corner of the base frame 26 and each unit including a vertically movable head 54. The additional base frame 50 is directly supported at the corners thereof by the heads 54 which are connected to said frame by suitable means. Referring to FIG. 2, it also will be seen that the side of the additional base frame 50 which extends across the front face of the machine, as viewed in FIG. 2, is provided with angularly and downwardly extending intermediate portions 56 to provide a central portion 58, positioned at a level below the other sides of the additional base frame 50 to provide clearance for a product removing conveyor, not shown. A section of the left-hand intermediate portion 56 has been broken away to expose details of the jack-operating mechanism, details of which are as follows:

A head 60 is mounted preferably at each corner of the base frame 26 and one of said heads, such as the left-hand one shown in FIG. 1, is provided with a heavy-duty, rotatable stud 62, having a suitable geometrical cross-sectional shape. The rotatable stud 62 may be engaged by a large, heavy-duty socket wrench, for example, and upon being rotated, suitable gearing in each of the heads 60 is interconnected by appropriate elongated shafts 64 which extend along all four sides of the base frame 26. Thereby, when the rotatable actuating stud 62 is operated, all four jack units 52 will be operated in a suitable direction to cause the head 54 of each jack simultaneously to move in the same vertical direction, either upward or downward, as the situation requires.

It also is to be understood that in lieu of projecting studs 62, for example, a hole may be formed transversely in the same for insertion of an operating rod therethrough. Similarly, as a further alternate, a socket may be provided in lieu of the stud 62 for reception of an appropriate large-sized Allen wrench, for example. From the foregoing, therefore, it will be seen that the additional base frame 50 which directly supports the mold-supporting frame 22 by means to be described may be moved in different transverse directions horizontally and also in opposite vertical directions for purposes of suitably aligning the mold cavities 16 of the mold dies 18 appropriately with respect to the axis of the vertically, upwardly fed parison 14 so as to enclose the parison with a pair of said dies at the loading station 38 which also may be termed a mold-closing station.

The Ferris wheel, mold-supporting frame 22, is mounted for rotation within a substantially vertical plane transverse to the axis of the base frame 26. For this purpose, additional base frame 50 supports, in transversely spaced relationship, a pair of vertical standards 66 and 68 which are heavy castings or the like firmly secured, at the lower ends thereof, directly to frame 50 by appropriate means, including keys 70, shown in FIG. 2, which insure against any migratory movement of said standards toward each other. The upper ends of the standards respectively support bearings 72 and 74 between which the main supporting shaft 76 extends and the opposite ends thereof preferably project beyond the outer ends of the bearing, respectively for the attachment of rotary joints thereto through which air and fluid respectively pass. The shaft 76, therefore, is tubular to accommodate certain conduits which are described in detail hereinafter.

The mold supporting frame 22 which is fixed to and carried by shaft 76, comprises a pair of side means 78 and 80, which are parallel to each other and extend transversely to the axis of the shaft 76. In actuality, the side means 78 comprises a pair of co-acting manifolds for gaseous fluid, preferably air, to transmit the same from conduits within the shaft 76 to one of the mold dies by which a parison needle is supported and relative to which it is movable to and from the mold cavity by means described hereinafter. The other side means 80 is a heavy substantially circular casting which primarily supports units of the actuating means for the mold dies which also is described hereinafter in detail.

The side means 78 is prevented from inward axial movement upon shaft 76 by a suitable means such as a lock ring 82 which is shown in detail in FIG. 18. Side means 80 is similarly positioned upon shaft 76 by additional lock rings 84 shown in FIG. 2. Extending between side means 78 and 80, in even circumferentially spaced relationship to each other, are pairs of similar guide rods 86, which are firmly secured at the ends thereof respectively to side means 78 and 80. Thus, it will be seen that the basic elements of the mold-supporting frame 22 comprise side means 78 and 80 and the guide rods 80 which extend therebetween and are connected firmly thereto, it being understood that the support of side means 78 and 80 upon shaft 76 is an essential feature of said mold supporting frame 22.

The circumferentially spaced arrangement of the various sets of guide rods 86 is best illustrated in FIG. 1. In order that the illustration in FIG. 2 might be simplified for clarity of concept, only the uppermost and lowermost pairs of guide rods 86 are illustrated therein, whereas the intervening sets have been omitted. It is to be understood, however, that the machine shown in FIG. 2 embodies a full complement of the guide rods such as shown in FIG. 1, as well as the various mold dies and supporting means therefor which are carried by the guide rods and details of which are as follows:

Mounted upon each pair of guide rods 86 is a pair of similar complementary jaws 88, which are provided with opposing vertical faces against which the mold dies 18 are firmly mounted by appropriate attaching means such as bolts or the like, not shown, in accordance with conventional practice in blow molding machines. The jaws 88 comprise suitable castings having guide bushings 92 therein which slidably receive the guide rods 86. The mechanism for actuating the jaws 88 and the mold dies 18 carried thereby are described hereinafter.

POWER MEANS FOR MOLD-SUPPORTING FRAME

Figure 5:
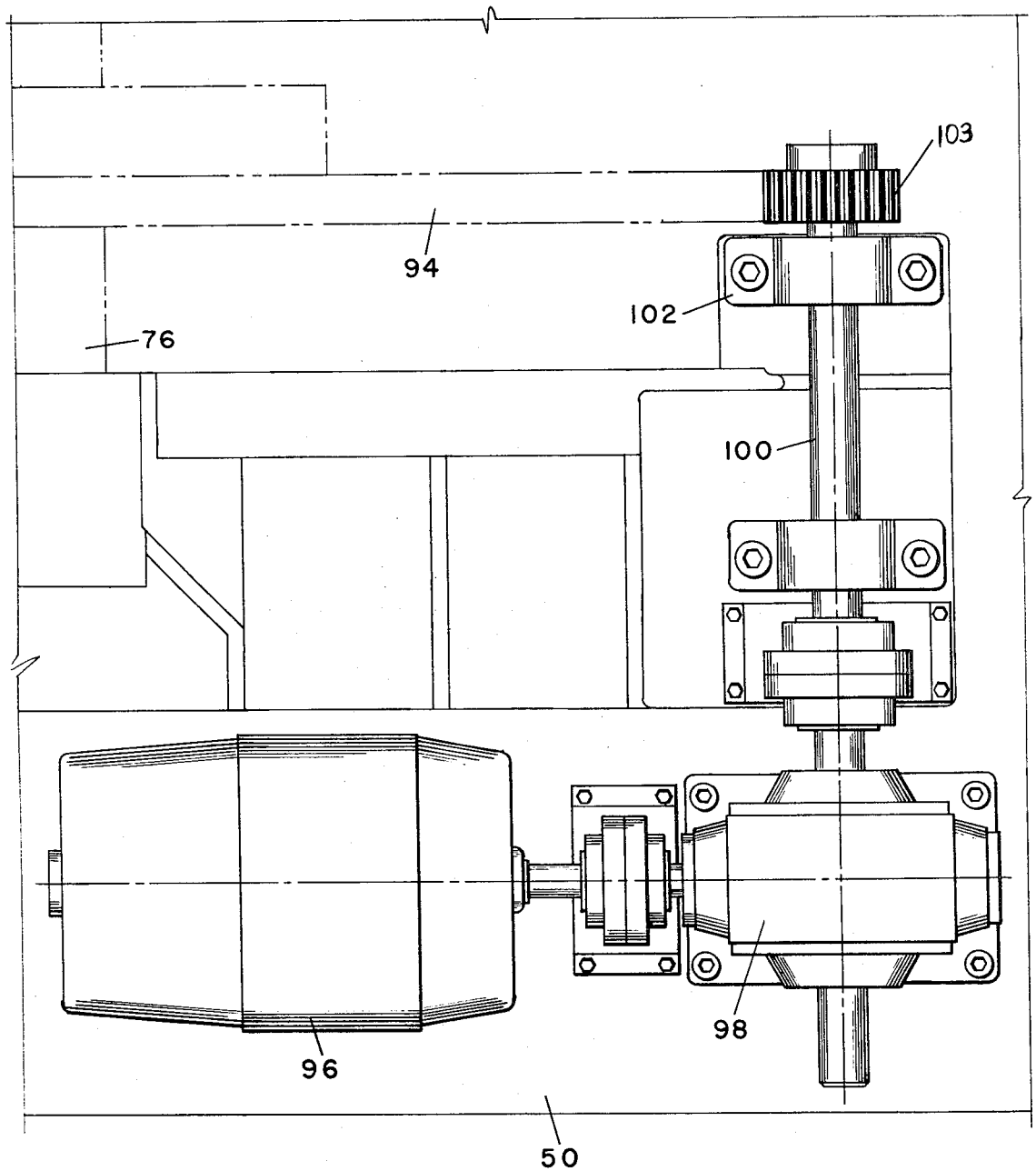
FIG. 5 is an enlarged top plan view of the power means of the machine shown in the preceding figures by which the Ferris wheel type of frame is rotated about the horizontal axis of the shaft which supports it, certain parts of the machine being shown fragmentarily in phantom to illustrate operative relationship between the machine and the power means.

Firmly secured to the outer face of the large casting comprising side means 80 is a bull gear 94 of extensive diameter as can readily be seen from FIGS. 1 and 2. Referring to FIGS. 2 and 5, it will be seen that the additional base frame 50, adjacent the right-hand end thereof relative to FIG. 2, supports an electric motor 96 which is connected to a gear reduction unit 98 from which a jack shaft 100 extends. The shaft is supported by appropriate bearings 102 and a pinion gear 103 of appropriate size meshes with and drives the bull gear 94 at a predetermined speed which is capable of adjustment by conventional means, not shown.

MOLD ACTUATION

Figure 7:
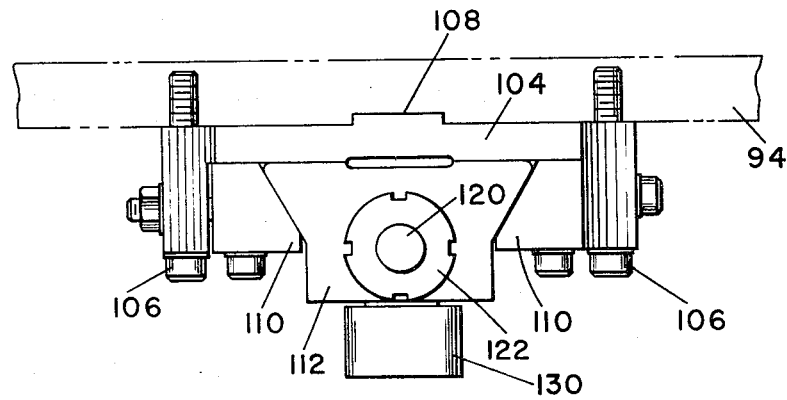
FIG. 7 is a top plan view of the unit shown in FIG. 6.
Figure 6:
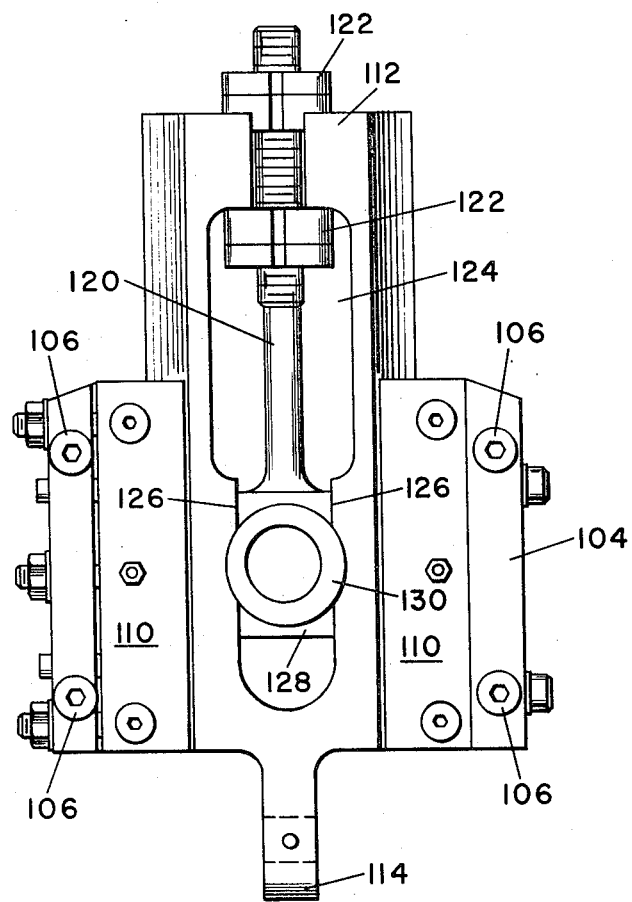
FIG. 6 is an enlarged elevation of an actuating unit for the linkage mechanism by which each pair of molds is reciprocally moved toward and from each other, one of said units being provided for each pair of molds.

Referring particularly to FIGS. 2-4, the mechanisms by which the mold-carrying jaws 88 are reciprocated toward and from each other upon each pair of guide rods 86 comprises various links, rods and slide members which are the same for each pair of jaws. Each set of such mechanisms comprises a guide block 104 which is secured to the outer face of the bull gear 94 by suitable bolts 106, as shown in FIGS. 6 and 7. Further, a flat projection 108 also is formed on the inner face of guide block 104 for reception within an appropriate radially extending channel milled into the outer face of bull gear 94 to further align the guide blocks upon the gear and maintain them in such alignment. Preferably, the guide blocks are provided with adjustable wear shoes 110, as shown in FIGS. 6 and 7, and the same being adjustable toward and from opposite diagonal faces of slide member 112 which, on one end thereof, has a tailpiece 114 provided with a transverse bearing hole therethrough to receive a pivot pin 116 which connects a pair of links 118 at opposite sides of said tailpiece.

Slide member 112 carries a stem 120 shown in FIG. 6, which, on its outer end, is threaded to receive sets of adjustable locknuts 122 which engage spaced seat surfaces engaged by said locknuts on the upper portion of slide member 112, said portion being partially defined by an opening 124 formed in the slide member 112. Said opening also provides a pair of opposite parallel guide faces 126 between which a crosshead 128 slides, the head being formed on the inner end of stem 120. A cam follower roll 130 is rotatably supported by the outer face of crosshead 128. The roll 130 engages actuating cam surfaces described hereinafter.

Supported in circumferentially spaced relationship upon the outer face of side means 80 are a plurality of mount blocks 132 which are fixedly connected thereto by suitable clamping bolts 134. A radially extending slot formed in each of the mount blocks 132 receives the intermediate portion of a bell crank 136 which is pivotally supported intermediately of its ends by a pin 138. Another pin 140 connects the outer end of each bell crank 136 to the links 118. Still another pin 142 connects the opposite end of each bell crank 136 to the outer slotted end of a link member 144, the opposite slotted end of which is connected by a pin 146 to a yoke 148.

Referring to FIG. 4, it will be seen that the yoke 148 is bored at the upper and lower ends thereof, parallelly to the guide rods 86, respectively to receive through the upper end thereof, the reduced end of shaft 150. The inner end of shaft 150 is headed and is received in a counterbore in jaw 88 to secure it thereto and extends through a plurality of strong, compressible means such as dished compression springs 152, preferably Bellville washers or equivalent compression means, as shown relative to the right hand jaw 88 in FIG. 3, by which the yoke 148 may exert predetermined pressure upon the jaw 88 and the mold die 18 carried thereby when moving the same toward the opposite jaw and mold die. The lower end of yoke 148 is fixedly connected to one end of push rod 154 which moves through a guide bearing 156 in the right-hand jaw 88, as viewed in FIGS. 3 and 4, for purposes of exerting equal and opposite pressure upon the linkage and rod means which actuate the opposite jaw 88 and the mold die 18 carried thereby, details of which are as follows:

Side member 78 at least partially comprises a substantially circular casting including a ring 158 positioned within a vertical plane and integrally connected to an annular rim 160. A plurality of support members 162 are mounted upon the periphery of the annular rim 160, in circumferentially spaced relationship with respect to each other. In effect, they comprise the counter parts of mount blocks 132 at the opposite end of the mold-carrying frame 22. Preferably, they comprise metallic castings or the like which are connected by suitable bolts 164, see FIG. 3, to the rim 160 and, to facilitate such attachment, keys 166 may be employed to prevent axial migration of the support members 162 relative to rim 160, as shown in FIG. 3. Similar keys 168 also may be employed between the mount blocks 132 and the side means 80 as also shown in FIG. 3, for a similar purpose.

The outer end of each support member 162 is provided with a slot 170, see FIG. 4, within which a link 172 is supported by pin 174. Push rod 154, which is connected at one end to yoke 148, adjacent the opposite side of the mold-supporting frame 22, extends through suitable bearings in the jaws 88, as well as ring 158, and the outer end thereof is connected by pin 176 which extends between a pair of links 178 which are connected by another pin 180 to one end of link 172. The opposite end of link 172 is connected by another pair of links 182 and a pin 184 to a lug on the outer end of a short push rod 186. The opposite end of rod 186 is headed, similarly to rod 150 in the opposite jaw 88, and is received in a counterbore formed in said jaw. Rod 186 also extends through and supports another set of dished compression springs 190, similar to the set of springs 152 on shaft 150. A pair of locknuts 188 are threaded on pushrod 186 to effect desired pressure of the springs 190 upon jaw 88. Accordingly, the shaft 186 engages jaw 88 only through the pressure exerted by the set of springs 190 which are applied against said jaw and mold die 18 carried thereby in direct opposition to the mold die 18 and jaw 88 positioned in association therewith immediately to the right side of the median line shown in FIGS. 3 and 4.

From the foregoing, it will be seen that as the slide member 112 is reciprocated radially by the cam follower roll 130 engaging cam means to be described, the bell crank 136 actuates link member 144 to move yoke member 148 simultaneously to press the set of compression springs 152 against the right-hand jaw 88 and mold die 18 carried thereby, as seen in FIGS. 3 and 4, and also urge push rod 154 toward the left as viewed in said figures. This simultaneously actuates the linkage assembly at the lefthand end of the units shown in FIGS. 3 and 4, and thereby moves push rod 186 toward shaft 150 to exert pressure, through the set of compression springs 190, against the left-hand jaw shown in FIGS. 3 and 4 and the mold die 18 carried thereby. Such pressure against the mold dies is substantially equal and in opposite directions.

By utilizing the sets of compressible springs 152 and 190 to apply the final closing pressure upon the yokes 88 and the mold dies 18 carried thereby, a predetermined limit in pressure will be imposed upon the mold dies. This pressure is adjusted to suit the size of the product being molded in the cavities of the dies. Such pressure can be adjusted, such as by operating the set of locknuts 194 which are threaded on shaft 150 and the set of springs 190 may be varied as to the ultimate pressure exerted thereby by adjusting the set of locknuts 188 which are threaded on shaft 150.

By reference to FIG. 2, it will be seen that at the upper side of the mold-supporting frame 22, the mold-actuating linkage and rods are shown in the positions they occupy when the molds are closed, while in the lower set of dies and the actuating means therefor, it will be seen that the latter are in open position of the dies. In the upper illustration, it also will be seen that the bell crank 136 and link member 144 are in mold-clamping position in which pins 138, 142 and 146 are all substantially in a straight line. Such arrangement will maintain the mold clamp in closed position by such arrangement until such time that the slide member 112 is moved by actuating cam means, to be described, to break the straight line position of said pivot pins and radially move the slide member 112 toward the axis of main shaft 76 to dispose the various links, rods, and other mold-actuating means in the relative positions thereof shown in relation to the lower set of mold-actuating means in FIG. 2. Due to the link member 144 and bell crank 136 comprising a toggle, it will be seen that, as the toggle moves to the straight line position to secure the dies in closed position, the movement of such dies in closing direction is progressively slower because of the horizontal vector of such toggle action. This is beneficial to minimize shock to the parison as the mold dies close around it. Movement of the actuating means to effect such opening and closing movements of the mold die is achieved by mold-actuating cam means now to be described.

MOLD ACTUATING CAM MEANS

Referring to FIGS. 2 and 8, an exemplary cam unit 196 or assembly is illustrated. Referring to FIG. 2, it will be seen that a backing or supporting plate 198, which preferably substantially is the same shape as the arcuate cam unit 196 shown in FIG. 8, is disposed adjacent the inner face of the right-hand standard 68 as viewed in FIG. 2. It has a radial extension 200 provided with a bearing opening 202 which surrounds the main shaft 76. It also has a link 204, the outer end of which is shown in FIG. 8, to which a threaded rod comprising part of a turnbuckle 206 is connected, the opposite end 208 comprising a clevis connected to a positioning lug 210 which is fixed to additional base frame 50 as shown in FIG. 8. By adjusting the length of the turnbuckle 206, the cam unit 196 may be moved arcuately, as a unit, to adjust the position at which the several actuating portions of the can unit function to move the slide members 112 radially to effect opening and closing of the mold dies.

In FIG. 8, it will be seen that the cam unit 196 comprises a principal cam section 212 and a relatively adjustable cam section 214. Cam section 212 has a face type cam slot 216 formed in one face thereof which has a dwell portion 218 of substantial length and an actuating portion 220, which, when engaged by the cam followers 130, operates the mold actuating means to move the mold dies to closed position. The fully closed position thereof is effected when the cam followers are moved outwardly beyond the terminal end of the mold actuating portion 220 of the cam slot.

The opposite end of cam slot 218 is co-extensive with the inner end of cam slot 222 in the adjustable cam section 214. The outer or entrance end 224 of cam slot 222 is funnel-like and of appreciable width at the entrance end to insure the ready reception of cam followers 130 as they progressively move clockwise relative to the cam unit as viewed in FIG. 8. Said followers initially engage the lower wall 226 of the entrance of cam slot 222 and continued movement of the followers causes them to engage the declining portion 228 of slot 222 to effect opening of the mold.

If it is desired to adjust the position of the cam section 214 in a circumferential direction relative to cam section 212, especially to effect opening of the molds at an earlier stage than would be possible when the cam sections are arranged as shown in FIG. 8, the adjustable cam section 214 may be moved counterclockwise, as viewed in FIG. 8, with respect to the principal cam section 212 by loosening clamping bolts 230 sufficiently to permit arcuate movement of cam section 214 to slide the arcuate slots 232 thereof relative to the bolts 230 until the desired adjusted position is achieved. Such arcuate movement is readily effected by another turnbuckle unit 234, the opposite ends of which are connected to ears 236 and 238 which are respectively connected to the cam sections 212 and 214. It also is to be noted that both of the adjustment-effecting turnbuckles 206 and 234 are located so that they may be actuated while the machine is operating and thereby not impede the operation of the machine by requiring the same to be stopped in order to effect such adjustment, thereby also facilitating quick adjustment to a satisfactory degree which may be determined by inspecting the products.

MOLD COOLING SYSTEM

Figure 9:
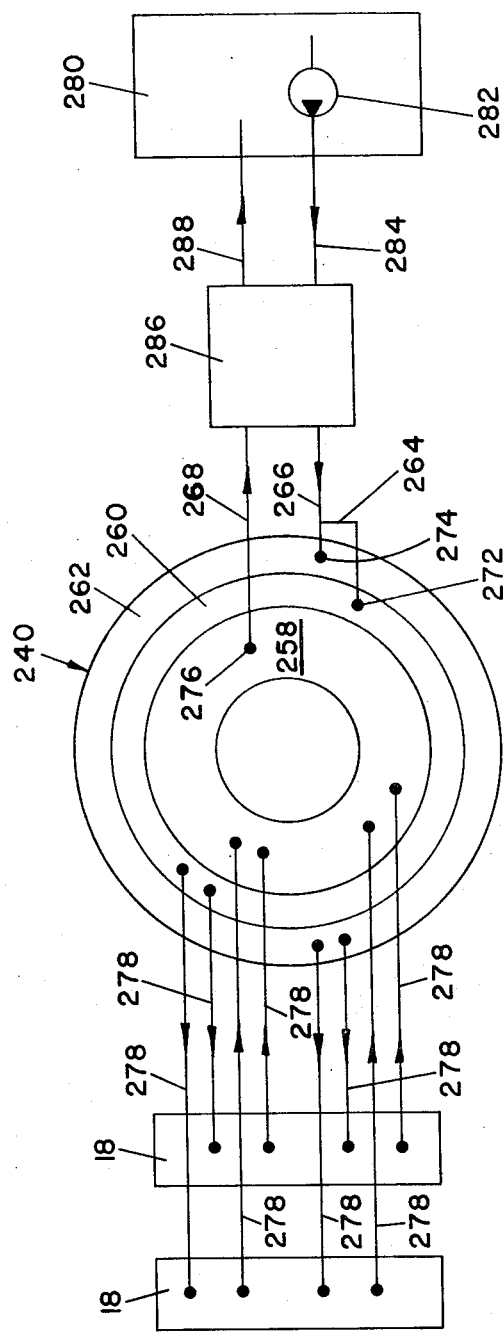
FIG. 9 is a diagrammatic plan view illustrating the circulating system for cooling fluid which is passed through the mold dies in heat-exchanging relationship.
Figure 15:
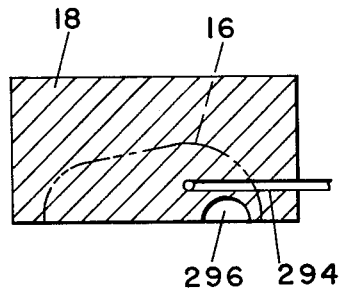
FIG. 15 is a further transverse sectional view of the die shown in FIG. 13 as seen on the line 15—15 thereof.

In order to maintain the temperature of the mold units 20 at substantially constant temperatures, appropriate cooling means are provided which, in the preferred arrangement, utilizes water as the cooling medium. Any suitable fluid may be used for this purpose, however, as desired. Referring to FIGS. 2 and 9–11, details of water manifold 240 are shown and, in FIGS. 12–15, exemplary circulatory systems for the cooling fluid are illustrated with respect to the mold dies per se. As shown in FIGS. 9–11, in particular, it will be seen that the manifold is of the type capable of providing plural zone cooling, the zones respectively being adapted to maintain different sections of the mold dies at different temperatures. For example, the portions of the mold cavities, in which are formed certain portions of a product having thicker walls, preferably should be provided with additional cooling capacity so that the overall temperature of the molded object will be as constant as possible, especially at the completion of the molding and the discharge of the molded object from the dies at the mold-opening station. One exemplary position such mold-opening station is approximately 270° around the path of movement from the mold-loading or closing station 38.

To provide the plurality of zones referred to, it will be seen that the water manifold 240 is mounted upon and carried by main shaft 76 substantially midway between the opposite side means 78 and 80 as best shown in FIG. 2. The manifold is actually a shell comprising opposite sidewalls 242 and 244 which are centrally bored to receive a hub 246 which is non-rotatably ancored upon shaft 76 by a key 248. Appropriate means such as a lock ring 250 also engages the shaft 76 to prevent relative axial movement between the fluid manifold 240 and shaft 76.

Concentric annular bands 252, 254, 256, which are concentric relative to each other and the hub 246, as well as shaft 76, are connected at the opposite edges thereof respectively to the sidewalls 242 and 244 so as to render the same water-tight and provide annular liquid-tight compartments 258, 260 and 262, which also are concentric with each other.

Referring to FIG. 10, it will be seen that a plurality of conduits 264, 266 and 268 are disposed within the tubular main shaft 76 and extend through appropriate openings, such as opening 270 in the wall of the shaft 76 as shown in FIG. 11 in exemplary manner. To simplify the showing in FIG. 11, only a single conduit 264 is seen, but it is to be understood that the three conduits referred to with respect to FIG. 10 also are accommodated within the shaft 76. One end of conduit 264, for example, communicates with coupling port 272 which communicates with annular compartment 260. As shown in the center of FIG. 10, conduit 266 is connected to coupling 274 which communicates with annular compartment 262. Lastly, conduit 268 communicates with coupling port 276 of compartment 258, the latter compartment primarily comprising a return compartment into which the cooling fluid which is returned from the molding dies, after passing through the same to cool them by carrying off some of the heat thereof, is accumulated for transmittal to a chilling unit. It also will be understood that, as shown in FIG. 2, a plurality of flexible conduits 278 extend between the mold dies 18 and the annular compartments 258 and 260 of the manifold 240.

Referring to FIG. 9, the circulation of the cooling fluid is illustrated diagrammatically, the direction of movement of the fluid being shown by appropriate arrows included in the symbolic transmission conduits 278 which extend between the annular compartments 258 and 260 for purposes to provide cooling fluid to the dies. Such fluid is returned by similar conduits 278 to the collecting compartment 258, from which the fluid is returned through conduit 268 to a chilling unit 280.

Transmission of the chilled fluid from unit 280, wherein it is chilled by any appropriate refrigerating mechanism, not shown, is effected by an appropriate pump 282, shown diagrammatically in chilling unit 280. The chilled fluid is conducted through conduit 284, shown in FIG. 9, to a rotary union 286, shown in FIG. 9, and also adjacent the right-hand end of FIG. 2. After the chilled fluid has passed through the cooling passages in the mold dies in the manner to be described immediately below, it is conducted into collecting compartment 258 and from there, by conduit 268, it is passed to the chiller unit 280, by means of conduit 288 shown in FIG. 9. The coupling connected to the rotary union 286, as shown at the right-hand end of FIG. 2, is intended to accommodate the conduits 284 and 288 to which suitable elongated conduit sections are connected.

Figure 14:
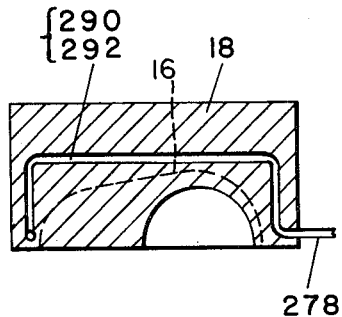
FIG. 14 is a sectional view through the mold die shown in FIG. 13 in a transverse direction as seen on the line 14—14 thereof.
Figure 12:
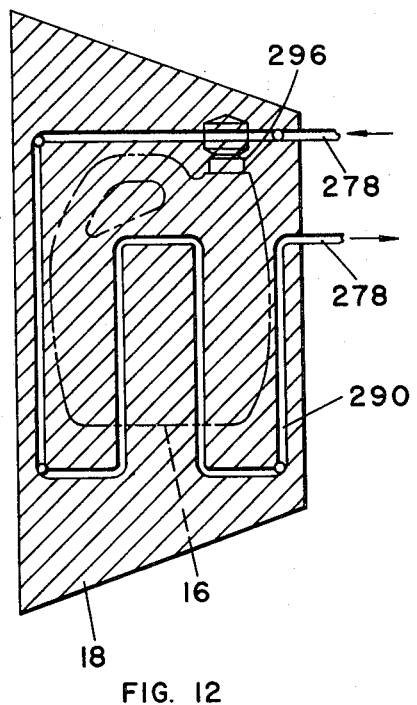
FIG. 12 is a transverse exemplary sectional view through a mold die illustrating somewhat diagrammatically an exemplary passage through said die for cooling fluid under circumstances where a single passage is provided.

Referring to FIGS. 12–15, two different general types of cooling passages are illustrated. In FIG. 12, a single circuitous passage 290 is illustrated in exemplary, rather than retrictive, manner, as being provided in one of the mold dies 18 in order to provide a predetermined temperature for the inner face of mold die cavity 16. A transverse view to that shown in FIG. 12 is seen in FIG. 14 in which the passage 290 also is illustrated in transverse relation to the disposition thereof shown in FIG. 12. Inlet and outlet ends of the circuitous passage 290 illustrated in FIG. 12 are connected by suitable coupling means to the fragmentarily illustrated flexible conduits 278, shown in FIG. 14 and also in FIG. 12.

Figure 13:
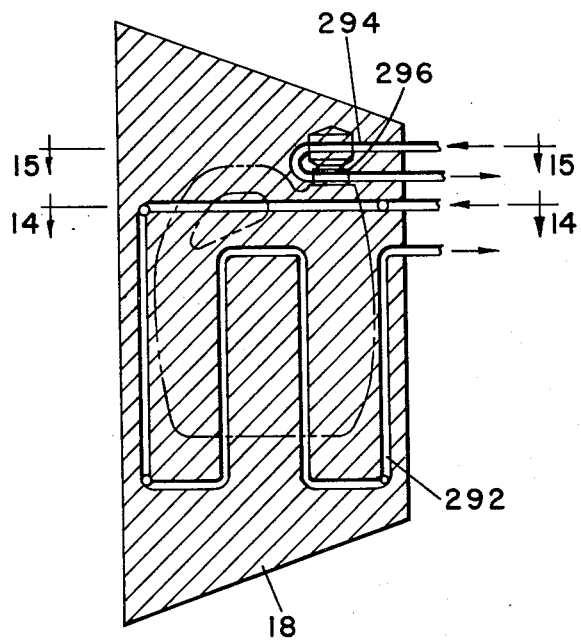
FIG. 13 is a view similar to FIG. 12 but showing a plurality of passages through such mold die for use under circumstances where zone type cooling is desired to provoke different cooling temperatures in different sections of said die.

Referring to FIG. 13, two different zones of cooling are provided respectively by one circuitous passage 292 and an additional circuitous passage 294. It will be understood that the outer ends of said passages also are connected suitably to flexible fluid conduits 278. In general, the passage 292 may also assume certain transverse directions as illustrated somewhat in exemplary manner in FIG. 14. The additional circuitous passage 294 is located in the die in the area thereof where the threaded filling or pouring spout portion of a container which is to be formed in the die cavities 16. The small portion 296 of said cavity requires supplemental cooling, due to the fact that the neck portions of such threaded pouring spouts usually are provided with thicker walls than the major wall portions of the container. Therefore, in order that the entire molded product may have a substantially uniform temperature at all sections thereof, at least within reasonable ranges, at the time it is discharged at the mold-opening station in the path of travel of the die cavities, such additional cooling arrangements are contemplated for provision by the present invention and thereby provide zone type chilling or cooling of the die. More than two different zones may be provided, if desired; by providing additional conduits and annular compartments of the type just described.

The water manifold 240 also is additionally connected to the mold-supporting frame 22 by having an exterior ring-like member 298 which surrounds and is fixed to the exterior surface of annular band 256 which defines the outermost annular fluid compartment 262. The member 298 has radial projections 300, each of which are provided with a pair of similar transverse bores 302, which are complementary in diameter to and receive the guide rods 86. An intermediate bore 304 is also provided in each projection 300 for slidable reception of the respective push rods 154 to guide the same. If desired, the projections 300 may be made separable from the ring-like member 298 and connected thereto by appropriate bolts, not shown, in a manner to effect a clamping engagement with the guide rods 86 which extend through the bores 302.

PARISON BLOWING MECHANISM

Mechanism operable to inject air under pressure into the parison for purposes of expanding the same into faithful engagement with the surfaces of the mold die cavity 16 of the dies 18 is illustrated principally in FIGS. 16–20. Such mechanism primarily comprises two cooperating manifolds. Of these, the principal manifold 306 actually comprises side means 78 of the mold-supporting frame 22. Auxiliary air manifold 308 is directly connected to the outer face of principal manifold 306 by a plurality of bolts 310, as best shown in FIGS. 19 and 20.

The manifold 306 comprises a hub 312 which receives and is keyed to main supporting shaft 76 by key 314. Surrounding and concentric with hub 312 is an annular member 316 which defines the outer periphery of an air chamber 318 into which dry, non-lubricated air is delivered through an appropriate conduit, not shown, which extends through tubular shaft 76, from a rotary joint 320 supported by the left-hand standard 66 as is seen in FIG. 2. The rotary joint 320 has an air inlet 322 which is connected to a source of dry, non-lubricated air, under pressure, not shown, and a second inlet 324 is connected to a source of air containing oil mist air lubricant, under pressure, not shown. Said inlets respectively communicate with suitable conduits, not chown, within the tubular main shaft 76 so as to extend past the bearing 72 at the left-hand end of the machine as viewed in FIG. 2.

The hub 312 is prevented from axial movement upon the main shaft 76 by the lock ring 82. Extending radially outward from and connected to the annular member 316 of manifold 306 are a plurality of webs 326 which are best shown in FIGS. 16 and 18. The outer ends of said webs are suitably connected to the inner surface of the annular rim 160 to which the support members 162 are connected for pivotally supporting the links 172 which are part of the mold-actuating mechanism. To facilitate such connection, the periphery of the annular rim 160 is circumferentially grooved at 328 in order to receive a key, not shown, which also is connected to the abutting surfaces of all support members 162, in order to prevent movement thereof relative to annular rim 160 in a direction parallel to the axis of main shaft 76. The webs 326 also preferably are connected to the ring 158 by any suitable means such as welding or otherwise.

As seen from FIG. 16, between each of the webs 326, the ring 158 is provided with a plurality of similar bores which receive one end of each of the guide rods 86 and appropriate anchoring members engage such end and abut the outer face of ring 158 to prevent relative axial movement of the guide rods with respect to the ring. The ring 158 also is provided with bores 332, through which the push rods 154 extend.

Referring to FIG. 18, an exemplary, diagrammatic inlet conduit 334, which receives dry, non-lubricated air from the rotary joint 320, introduces said air under pressure into the air chamber 318. Said chamber is provided with a plurality of outlet ports 336. Referring to FIG. 20, which is a sectional view taken from the opposite side of the machine from that from which FIG. 18 was taken, it will be seen that auxiliary air manifold 308 is provided with a plurality of ports 340 which are aligned with outlet ports 336 of manifold 306, the ports 340 communicating with radially extending passages 342 which lead to and communicate with the inlet of each of one set of air-control valves 344.

As seen from FIG. 19, the valves 344 have a pair of actuators 346 and 348 thereon. Referring to FIG. 19, the main shaft 76 is driven so that it and all of the mechanism attached thereto rotates in the direction of the arrow shown adjacent the periphery thereof. Accordingly, actuator 348 of each valve 344 operates to open the valve to permit the passage of parison injection air through the valve and actuator 346 closes the valve to stop the passage of such air. Cam means, described hereinafter, operate the valve actuators incident to the rotation of the connected air manifolds.

The auxiliary air manifold 308 also provides and distributes air from inlet 324 which contains an oil mist, whereby it is of a lubricating nature. Referring to FIG. 20, it will be seen that a conduit 350, which is shown fragmentarily, will be understood to receive such lubricating type air from a conduit which extends through the tubular main shaft 76 and is connected to air inlet 324 of the rotary joint 320. Auxiliary manifold 308 is effectively formed from a pair of similar metal discs 352 and 354. They are also secured together by the bolts 310. A coupling 352 secures the conduit 350 to the disc 354 which has a port therein that communicates with an annular groove 356, which is best shown in FIG. 19, and comprises a manifold distributing channel for such lubricating type air.

Figure 23:
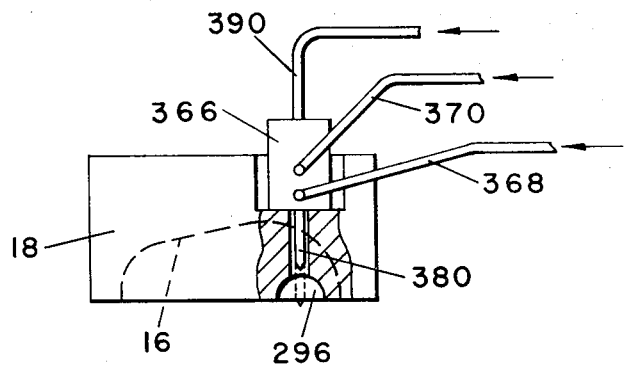
FIG. 23 is a fragmentary top plan view of a typical mold and air cylinder assembly which supports and operates the parison injection needle for each pair of mold dies.

As also seen from FIGS. 19 and 20, the annular distributing groove 356 has a plurality of short radially extending grooves 358, which respectively communicate with the inlet port of air-controlled valves 360. Each of said valves is what is known as a 4-way valve and each is provided with a pair of actuators 362 and 364 which are adapted to be operated in sequence by cam means which also are described hereinafter. The valves 360 control the flow of air to opposite ends of the piston in a series of similar needle-projecting units 366, exemplary sectional illustration of which is shown on an enlarged scale in FIG. 22. Attention also is directed to FIG. 23 in which the unit 366 is illustrated in operative position with respect to one of the mold dies 18 of each pair 20 thereof.

A pair of conduits 368 and 370, shown in FIGS. 2 and 20, respectively communicate with inlet ports 372 and 374 of the cylinders of each of the needle-projecting units 366, as shown in FIG. 22. Said ports respectively communicate with opposite ends of a piston 376 which operates within the cylinder bore 378. A parison puncturing needle 380 extends from one end of the piston rod 382. As air alternately is introduced from the ports 372 and 374 through operation of the actuators 362 and 364 of valves 360, the puncturing needle 380 is reciprocated axially between the full and dotted line positions thereof respectively shown in FIG. 23. When projected to the dotted line position thereof, it will be seen from FIG. 23 that the needle intersects the neck-forming portion 296 of die cavity 16, for example, said position being suitable for intersecting the tubular parison 14 when it is initially enclosed between a pair of the mold dies 18.

Referring to FIG. 22, it will be seen that the bore of the puncturing needle 380 extends inward from the outer end thereof to a transverse bore 384. When it is in the position shown in FIG. 22, the transverse bore 384 communicates with an air discharge port 386. However, when the piston 376 is projected toward the opposite end of cylinder bore 378, the transverse bore 384 in the shank of needle 380 will be extended so as to communicate with parison injection air inlet port 388 and discontinue communication with discharge port 386.

Inlet port 388 of each needle-projecting unit 366 is connected by conduit 390 with the outlet of valve 344 so as to receive parison inflatable air therefrom, as controlled by the operation of valve 344. It will be understood that there is a control valve 344 for each of the mold units 20, only one of which is illustrated in FIG. 2, however, as being connected by conduits with the manifold 306 in order to simplify the illustration. Thus, when the needle 380 is moved to projected position, and particularly, when considering the relative positions of valves 344 and 360, it will be seen that the actuator 348 of valve 344 will initially be opened to project the needle and this is immediately followed by the actuator 362 of valve 360 functioning to open the valve 360 to inject air through needle 380 into the parison. Then, after a momentary duration which is adequate to completely inflate the parison into conformity with the die cavity surfaces of the molding dies, actuator 364 of valve 360 functions to stop the flow of such inflating air, and this immediately is followed by actuator 346 of valve 344 functioning to move the piston 376 in retracting direction to withdraw the needle 380 from the parison.

AIR VALVE CONTROL CAM UNIT

Operation of the actuators of each of the valves 344 and 360, which respectively control the operation of piston-actuating air and parison inflatable air, is effected and controlled by a cam unit 392. In FIG. 2, said unit is shown in operative position as supported by the standard 66, which has a suitable projection 394 thereon against which the cam unit 392 is positioned. Cam unit 392 also is adapted to be arcuately adjusted about the axis of main shaft 76 and, for this purpose, a pair of arcuate flanges 396 and 398 are provided upon the block 394 to guide the cam unit in such arcuate adjustment, as shown in FIG. 21.

FIG. 21 is a view on a larger scale than shown in FIG. 2, as seen on the line 21—21 of FIG. 2. To simplify FIG. 2, only a single valve 344 is shown. However, the cam unit 392 is provided with four independently adjustable cam members comprising valve strikers 400, 402, 404 and 406. Preferably, the strikers are in the form of small rollers supported by base blocks which are secured adjustably with respect to arcuate slots 408 formed in the arcuate plate of the cam unit 392 which is guided between the flanges 396 and 398. Appropriate bolts 410 threadably engage each of the supporting blocks for the valve strikers and effectively secure the strikers in desired arcuate position in accordance with the timing sequence for operation of the valves 344 and 360.

Under circumstances where adjustment of the operation of all of the valves is desired simultaneously, it will be seen that the arcuate plate 412, which commonly supports all of the valve strikers, has an ear 414 to which one end of a position-maintaining rod 416 is connected. The opposite end of the rod passes through a keeper 418 and suitable means, such as a set screw 420, is adequate to prevent movement of rod 416 relative to keeper 418 after adjustment has been effected. It will thus be seen that a very wide latitude in the adjustability of the position of the valve strikers 400, 402, 404 and 406 is possible due to the arrangement which permits individual adjustment of the same with respect to the arcuate supporting plate 412, as well as simultaneous adjustment of all of the valve strikers being made possible through operation of the rod 416 relative to the keeper 418. In addition, it is to be noted especially from FIG. 2, that the adjustment of the valve strikers, either individually or simultaneously, is possible to be effected while the machine is operating, due to the location of the cam unit 392 with respect to the standard 66.

Figure 25:
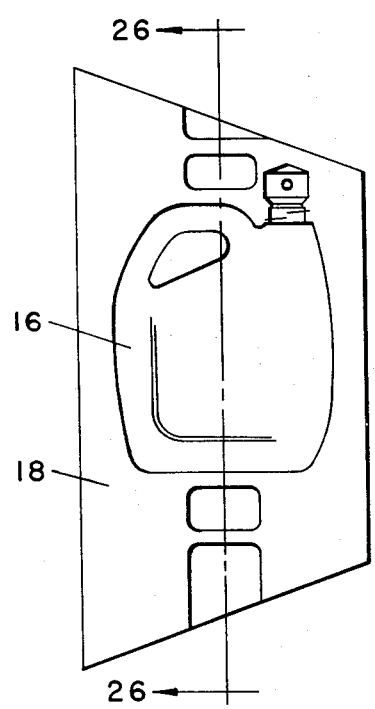
FIG. 25 is an open face view of an exemplary mold die of the type suitable to be employed in the machine comprising the present invention.
Figure 26:
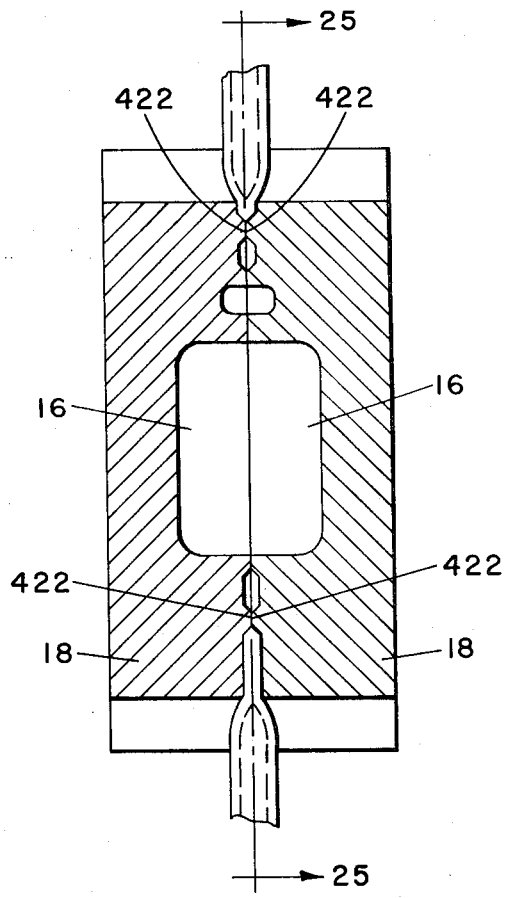
FIG. 26 is a longitudinal sectional view through a pair of mold dies of the type shown in FIG. 25 as seen on the line 26—26 thereof.

Referring to FIGS. 25 and 26, an exemplary illustration of a mold die cavity 16 in a typical mold die 18 is shown in FIG. 25, while in FIG. 26, a pair of complementary mold dies 18 are shown in which mold dams 422 are illustrated as a preferred type of means to control the thickness of the opposite ends of a hollow object, such as a container, which is formed by operation of the machine comprising the present invention. Specifically, such dams comprise the subject matter of pending application, Ser. No. 123,596, in the name of William C. Waterloo, filed Mar. 12, 1971. It is to be understood, however, that the invention is not restricted to the use of dies having such flow-control means as the dams 422.

Another aspect of the invention is that the speed at which the mold die cavities 16 are moved upwardly as viewed in FIG. 1, with relation to the mold-closing station 38, at which location the mold die cavities are moving substantially vertically, preferably is slightly greater than the rate at which the tubular parison 14 is being fed upwardly from the flow head 12. This produces longitudinally extending tension in the parison. Further, when the parison is enclosed between a pair of the mold dies, as illustrated in exemplary manner in FIG. 26, and inflating air is introduced into the parison under pressure after puncturing the same by needle 380, transverse tension is imposed upon the parison in a direction perpendicular to the axis thereof. Accordingly, it will be seen that bi-axial orientation of the molecules comprising the synthetic resin material of the parison is effected which greatly improves the strength of the formed product through such rearrangement of the molecular structure of the material.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A machine for molding hollow articles from plasticated synthetic resin by blowing gaseous fluid into a hollow parison of said resin when enclosed within a mold cavity, said machine comprising in combination, a base frame, a main shaft, bearing means above said base frame in fixed relation thereto and rotatably supporting said main shaft substantially horizontally, mold-supporting frame means surrounding said main shaft and fixed thereto for rotation therewith within a substantially vertical plane, pairs of cooperating mold dies carried by said mold- supporting frame means in circumferentially spaced relationship to each other and movable with said mold-supporting frame means about the axis of said shaft, means engaging said mold dies and operable to move the same reciprocably into closed and open relationship, power means interconnected to said main shaft to rotate the same and said molds on said mold-supporting frame means unidirectionally in a path past a mold-closing station position substantially midway of the side of the path of movement of said mold dies wherein they are moving upwardly, means operable adjacent said station to move said mold dies into closed position to encircle a parison of synthetic resin and also move said closed dies past a circumferentially spaced mold-opening station where said mold dies are moving downwardly to open the dies to release a hollow blown-in-the-mold product, means to form and feed a plasticized parison of synthetic resin upwardly for engagement between said mold dies at said mold-closing station, and means operable to effect vertical and horizontal adjustment of the position of said dies at said mold-closing station relative to the upward feed direction of said parison to insure engagement of said parison by said mold dies while said parison is substantially straight and vertical to suitably position said parison in said mold for even expansion thereof therein in both axial and transverse directions.

2. The machine according to claim 1 in which said means to effect adjustment of the position of said dies includes means to adjust said position horizontally in two directions transverse to each other..

3. The machine according to claim 2 in which said means to adjust said position of said dies is positioned upon said machine at a location to permit access to the same for actuation and effecting of such adjustment while the machine is operating.

4. The machine according to claim 3 in which said means to adjust said position of said dies comprises a link extending between said base frame and said parison-forming means and includes a turn buckle operable to extend and contract the length of said link.

5. The machine according to claim 2 in which said means to adjust said position of said dies includes means to effect adjustment of said mold-supporting frame means in vertical direction substantially parallel to the axis of a vertically movable parison at the mold-closing station to additionally align said parison relative to the cavities in the mold dies within which the parison is to be blown into a hollow product.

6. The machine according to claim 4 in which said means to adjust said position of said dies also includes a plurality of wheels located at spaced positions upon said base frame and supported upon axles rotatably connected to said base frame and said wheels being axially adjustable upon said axles.

7. The machine according to claim 1 in which said means to adjust said position of said dies including means upon said base frame operable to adjust said main shaft in a vertical direction relative to said base frame and thereby adjustably vary the position of said mold-closing station in the path of movement of said pairs of mold dies relative to said means to form and feed a plasticized parison of synthetic resin.

8. The machine according to claim 7 in which said means upon said base frame comprises a plurality of jacks located at spaced positions upon said base frame and engageable with means supporting said bearings for said main shaft to vary the vertical position of the axis thereof relative to said base frame.

9. The machine according to claim 1 in which said means to move said mold dies into closed and open relationship comprise linkage mechanisms respectively connected to said pairs of dies, and said machine further including actuating means extending between each pair of mold dies and engageable with said linkage mechanisms as said mold-supporting frame means moves about the axis of said main shaft to open and close said pairs of dies simultaneously, said actuating means also comprising a cam at one side of said machine and adjustably positionable relative to said base frame and thereby being operable to adjust the position of the mold-closing station and the mold-opening station in the path of movement of said dies.

10. The machine according to claim 1 further including a water manifold connected to and carried by said main shaft and water conduit means extending into said shaft from one end thereof and connectable to a source of cooling water, said mold dies having cooling passages therethrough and said machine further including conduits extending between said passages in said mold dies and said water manifold to conduct cooling water to and from said dies, and said machine also including a fluid reciprocable parison inflatable needle on each pair of mold dies, an air manifold on said main shaft adjacent the opposite end thereof, conduits extending between said air manifold and said needles, and air conduit means extending into such shaft from the opposite end thereof to said air manifold, the outer end of said air conduit being connectable to a source of air under pressure for transmission to said parison to inflate the same through said needles when they are reciprocably ejected into said parison when enclosed within a pair of said mold dies, said separate air and water manifolds and the inlets of sources of air and water respectively being at opposite ends of said main shaft, thereby minimizing the possibility of leakage between air and water in said machine during operation thereof.

11. A machine for molding hollow articles from plasticized synthetic resin by blowing gaseous fluid into a hollow parison of said resin when enclosed within a mold cavity, said machine comprising in combination a base frame, mold-supporting frame means supported by said base frame upon a substantially horizontal shaft for rotation of said mold-supporting frame means within a substantially vertical plane, pairs of cooperating mold dies supported by said mold-supporting frame means in circumferentially spaced arrangement to each other for unidirectional movement around a circular path having a mold-closing station and a mold-opening station therealong in circumferentially spaced relationship, means operable to form and feed a plasticized synthetic resin parison to said path adjacent said mold-closing station for reception of said parison successively between pairs of said mold dies at said mold-closing station, a parison inflatable needle operable relative to each pair of mold dies and movable therewith by said mold-supporting frame means, an air manifold rotatable with said mold-carrying frame means and connectable to a source of air under pressure, conduit means respectively connecting said manifold to said needles, valve means movable with said mold-supporting frame means and sequentially operable to control the flow of air to said needles, and control means for the operation of said valve means comprising a cam unit adjustable connected to said base frame and thereby being adjustable relative to the path of movement of said valve means to regulate the injection of air into said parison and discontinuance thereof relative to the movement of said mold dies through the path of movement thereof.

12. The machine according to claim 11 in which said cam unit comprises a plurality of cam members mounted upon a supporting member and at least one of said cam members being adjustable relative to said supporting member for adjustable positioning thereof relative to the other cam member, whereby the positions at which air is injected into a parison and the injection of such air is discontinued may be varied in accordance with requirements of the operation of said machine incident to producing a specified type of product.

13. The machine according to claim 12 in which said supporting member is adjustably connected to means fixed relative to said base frame, whereby adjustment of said supporting member may be effected as desired and thereby simultaneously adjust the position of said cam members thereon relative to said base means.

14. The machine according to claim 11 in which said needles are carried by heads mounted upon said mold dies and including cylinder and piston means, said needles being carried by the piston means and operable thereby for projection and retraction into and from a parison for the discharge of air into the same to expand it within a mold cavity.

15. The machine according to claim 14 further including conduit means between said air manifold and said cylinder and piston means for projection and retraction of said needles, and said machine including additional valves in said conduit means mounted relative to said mold-supporting frame means and operable to control the flow of air to said cylinder to effect projection and retraction of said needle relative to mold cavities within said mold dies, and additional control means for said additional valves mounted stationarily relative to said base frame and engageable by said valves as moved during the rotation of said mold carrying frame about the axis of said shaft which supports the same.

16. The machine according to claim 15 in which said additional control means comprise cams independently adjustable upon supporting means relative to the path of movement of said mold-supporting frame means and said additional valves carried thereby.

17. The machine according to claim 16 in which said supporting means is arcuate about the axis of said shaft which supports said mold-supporting frame means and including similar arcuate slots within which said cams are mounted for clamped connection to said supporting means.

18. The machine according to claim 16 in which said supporting means is adjustable relative to the base frame of said machine to effect simultaneous adjustment of said independently adjustable cams carried by said supporting means.

19. The machine according to claim 18 in which said control means for said valves which operate to effect injection of air into said parison when enclosed in the mold cavity of each pair of mold dies comprise cam means adjustably mounted upon said supporting means for said actuating cams which control the actuation of said cylinder/piston units of said air injecting needles, whereby said control cams which operate the valves for the needle actuating air and the parison injection air may be independently adjustable with respect to each other by varying the cams relative to the supporting means or all of said cams may be simultaneously adjusted by moving said supporting means relative to said base frame.

20. A machine for molding hollow articles from plasticated synthetic resin by blowing gaseous fluid into a hollow parison of said resin when enclosed within a mold cavity, said machine comprising in combination base means supporting a horizontal shaft for rotation about its axis, frame means fixed to and surrounding said shaft and comprising side means spaced axially, upon said shaft guide units extending between said side means and circumferentially spaced from each other and radially spaced from said shaft, mold means comprising pairs of cooperating mold dies mounted for reciprocation in opposite directions upon said guide units between said side means of said frame for opening and closing said mold means, sets of mechanical mold-actuating means carried by said frame means and operable to move said mold dies toward or from each other simultaneously, and control means fixed relative to said base means and operable as said shaft and frame means rotate sequentially to effect closing of said mold means adjacent a mold loading station and opening said mold means adjacent a mold unloading station in the path of movement of said frame means.

21. The machine according to claim 20 in which said guide units comprise pairs of parallel rods fixed relative to said frame means and disposed in circumferentially spaced relationship with respect to each other around the axis of said shaft.

22. The machine according to claim 21 in which said guide means comprise pairs of parallel guide rods and said machine further including pairs of jaws slidably mounted upon said guide rods, said pairs of mold dies respectively being connected to said jaws upon said pairs of parallel guide rods for support thereby, said mold actuating means being actuated as said frame means move said mold dies through the circular path of movement thereof, additional actuating means being connected to the other jaw of each pair thereof, and means on said one jaw connected to the actuating means on the other jaw to effect simultaneous operation of both jaws respectively in opening and closing directions as said frame means revolves.

23. The machine according to claim 22 in which said jaw actuating means comprises connected links and one of said actuating means including toggle linkage operable to clamp the mold dies in closed position with respect to each other.

24. The machine according to claim 23 in which said means on one jaw which is connected to the actuating means on the other jaw comprises a rod connected to said one jaw and movable through guide means in the other jaw.

25. The machine according to claim 23 in which said toggle linkage includes a bell crank movable in opposite positions about the pivot thereof respectively to dispose the toggle linkage in straight line position to clamp said dies in closed position and break said straight line position to effect opening of said mold dies, the operation of said toggle linkage producing decreasing speed of movement of said dies from the open position thereof to the closed position thereof and thus minimizing the possibility of distorting the parison as it is being disposed within the mold cavity between each pair of mold dies.

26. The machine according to claim 23 in which said actuating linkage connected to said one jaw has a cam follower connected thereto and said machine including a cam supported relative to said base means and engageable by said cam follower during the circular path of movement of said mold die to effect the opening and closing of each pair of said mold dies.

27. The machine according to claim 26 which includes means to adjust said cam relative to said base means to control the position of said mold-loading and mold-unloading station in said path of movement of said mold dies.

28. The machine according to claim 27 in which said cam comprises two cam sections operable with respect to each other and relatively adjustable in an arcuate path about the axis of said shaft as a center.

29. The machine according to claim 27 in which said means to adjust the cam relative to said base means includes adjustment securing means positioned for access and operation thereof while said machine is operating.

30. The machine according to claim 29 further including adjustable compression means mounted between said mold dies and said actuating means therefor, said compression means being adjustable to vary the pressure exerted upon said dies when in closed position in accordance with the size of an article being molded within said closed dies.

31. The machine according to claim 20 in which one of said side means of said frame means comprises an air manifold and the opposite side means comprises a substantially circular hub member, said sets of mold-actuating means comprising connected link members, and the peripheries of said air manifold and circular hub member supporting pivot means for said connected link members.

32. The machine according to claim 31 further including radially slidably actuating means carried by said frame means adjacent one side thereof and respectively connected to each of said sets of connected links, each of said actuating means having a cam follower thereon, and a cam supported relative to said base means and engageable by said cam followers during the rotatable movement of said frame means sequentially to move the pairs of mold dies on said frame means in opposite directions respectively to close and open said dies.

33. The machine according to claim 32 further including means to adjustably connect said cam circumferentially relative to the axis of said shaft of said machine and secure the same in a desired adjusted position thereof to determine the position of said mold-loading station and mold-unloading station in the path of movement of said mold dies.

34. The machine according to claim 1 further including a water manifold connected to and rotatable with said shaft and having means connectable to a source of cooling water, said manifold having two separate compartments therein respectively adapted to contain water at two different cooling temperatures, said mold dies each having two separate passages therein to transmit cooling water therethrough, and a conduit respectively extending between said separate compartments in said water manifold and said separate passages in said mold die permit the cooling of different sections of said die to different temperatures according to the requirements incident to molding specific shapes and masses of synthetic resin included in the molded objects formed within said dies by said machine.

35. The machine according to claim 34 in which said shaft has conduit means extending inward from one end thereof and communicating with said water manifold to furnish cooling water thereto and additional conduit means leading from said water manifold to said one end of said shaft to remove water from said manifold after passing through said mold dies, and rotary union means mounted on said one end of said shaft and adapted to connect water supply and return conduits to said one end of said shaft.

\* \* \* \* \*